(12) United States Patent
Aaron et al.

(10) Patent No.: US 12,058,524 B2
(45) Date of Patent: *Aug. 6, 2024

(54) TAMPER-RESISTANT DATALINK COMMUNICATIONS SYSTEM

(71) Applicant: Calective LLC, Escondido, CA (US)

(72) Inventors: Lydell Aaron, Laguna Niguel, CA (US); Benjamin De Villa, Murrieta, CA (US)

(73) Assignee: Calective LLC, Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,398

(22) Filed: Mar. 2, 2023

(65) Prior Publication Data

US 2023/0209354 A1    Jun. 29, 2023

Related U.S. Application Data

(63) Continuation of application No. 17/732,306, filed on Apr. 28, 2022, now Pat. No. 11,622,274.

(Continued)

(51) Int. Cl.
*H04L 12/00*    (2006.01)
*B64C 39/02*    (2023.01)
(Continued)

(52) U.S. Cl.
CPC ......... *H04W 12/122* (2021.01); *B64C 39/024* (2013.01); *H03K 7/08* (2013.01);
(Continued)

(58) Field of Classification Search
None
See application file for complete search history.

(56) References Cited

U.S. PATENT DOCUMENTS

D482,351 S    11/2003   Alviar et al.
D579,010 S    10/2008   Tseng
(Continued)

FOREIGN PATENT DOCUMENTS

CN    306928604    11/2021
CN    308116840    7/2023
(Continued)

OTHER PUBLICATIONS

International Search Report received in PCT/US2022/026803, mailed Jul. 29, 2022.

(Continued)

*Primary Examiner* — Noel R Beharry
*Assistant Examiner* — Lionel Preval
(74) *Attorney, Agent, or Firm* — Knobbe Martens Olson & Bear LLP

(57) ABSTRACT

This application relates to a tamper-resistant datalink communications system. The system may include a ground-based communications module configured to be coupled to a radio controller configured to remotely control a drone comprising one or more actuators and a remote-mounted communications module configured to communicate data with the ground-based communications module. The ground-based communications module may include a ground processor configured to: receive a plurality of first signals modulated with a first modulation scheme from the radio controller, convert the plurality of first signals to a second signal modulated with a second modulation scheme different from the first modulation scheme, and generate a plurality of second duplicated signals comprising two or more duplicate signals of the second signal. The ground-based communications module may also include a plurality of ground transmitters configured to operate in different frequencies and respectively transmit the plurality of second (Continued)

duplicated signals to the remote-mounted communications module.

18 Claims, 41 Drawing Sheets

Related U.S. Application Data

(60) Provisional application No. 63/183,801, filed on May 4, 2021.

(51) Int. Cl.
| | | |
|---|---|---|
| *H03K 7/08* | (2006.01) | |
| *H04B 1/715* | (2011.01) | |
| *H04B 17/345* | (2015.01) | |
| *H04W 4/40* | (2018.01) | |
| *H04W 12/122* | (2021.01) | |
| *H04W 24/10* | (2009.01) | |
| *H04W 36/30* | (2009.01) | |

(52) U.S. Cl.
CPC ........... *H04B 1/715* (2013.01); *H04B 17/345* (2015.01); *H04W 4/40* (2018.02); *H04W 24/10* (2013.01); *H04W 36/30* (2013.01); *B64U 2201/20* (2023.01); *H04B 2001/7154* (2013.01); *H04B 2201/713* (2013.01)

(56) References Cited

U.S. PATENT DOCUMENTS

| | | | |
|---|---|---|---|
| D589,946 S | 4/2009 | Yamamoto | |
| D602,020 S | 10/2009 | Haspil et al. | |
| D738,869 S | 9/2015 | Groener et al. | |
| D759,012 S | 6/2016 | Golden et al. | |
| D763,851 S | 8/2016 | Schneider et al. | |
| D809,491 S | 2/2018 | Tinaphong et al. | |
| 10,059,445 B2 * | 8/2018 | Meinhart | ................ F41H 13/00 |
| D853,999 S | 7/2019 | Jiang | |
| D943,564 S | 2/2022 | Wang et al. | |
| D956,728 S | 7/2022 | Takiguchi et al. | |
| D973,040 S | 12/2022 | Liu et al. | |
| 11,622,274 B2 * | 4/2023 | Aaron | ...................... H03K 7/08 |
| | | | 370/338 |
| D993,197 S | 7/2023 | Wang et al. | |
| 2006/0256768 A1 * | 11/2006 | Chan | ...................... H04L 45/28 |
| | | | 709/250 |
| 2015/0147976 A1 * | 5/2015 | Wang | ...................... A63H 27/02 |
| | | | 455/65 |
| 2017/0133764 A1 | 5/2017 | Tinaphong et al. | |
| 2019/0051190 A1 | 2/2019 | Russell et al. | |
| 2019/0199756 A1 | 6/2019 | Correnti et al. | |
| 2019/0236962 A1 | 8/2019 | Tholen et al. | |
| 2019/0306675 A1 | 10/2019 | Xue et al. | |
| 2020/0287619 A1 * | 9/2020 | Tavner | ................... G05D 1/101 |
| 2020/0294401 A1 | 9/2020 | Kerecsen | |
| 2021/0058936 A1 | 2/2021 | Gordaychik | |

FOREIGN PATENT DOCUMENTS

| | | | | |
|---|---|---|---|---|
| EP | 3229445 B1 * | 8/2018 | ........... | G05D 1/0022 |
| KR | 10-1852851 B1 | 4/2018 | | |
| WO | WO 2018/170739 | 9/2018 | | |

OTHER PUBLICATIONS

Kao, "Performance analysis of a JTIDS/link-16-type waveform transmitted over slow, flat Nakagami fading channels in the presence of narrowband interference", Naval Post Graduate School Dissertation given Dec. 2008, in 209 pages.

White, "Tactical Data Links, Air Traffic Management, and Software Programmable Radios", IEEE, 1999, 5.C.5-1-5.C.5-8.

Office Action received in TW Application No. 111116802, dated Jan. 11, 2023.

Office Action received in U.S. Appl. No. 17/732,306, dated Jul. 12, 2022.

Notice of Allowance dated Dec. 20, 2023 for U.S. Appl. No. 29/864,030 in 9 pages.

* cited by examiner

Transmitter 1: PWM 1, PWM 3, PWM 5, PWM 7, PWM 9, PWM 11, PWM 13, PWM 15

Transmitter 2: PWM 2, PWM 4, PWM 6, PWM 8, PWM 10, PWM 12, PWM 14, PWM 16

Transmitter 3: Code [1,2], Code [3,4], Code [5,6], Code [7,8], Code [9,10], Code [11,12], Code [13,14], Code [15,16]

FIG. 23A

Transmitter 1: PWM 1 | PWM 3 | Code [5,6] | PWM 7 | PWM 9 | Code [11,12] | PWM 13 | PWM 15

Transmitter 2: PWM 2 | Code [3,4] | PWM 6 | PWM 8 | PWM 10 | PWM 12 | Code [13,14] | PWM 16

Transmitter 3: Code [1,2] | PWM 4 | PWM 5 | Code [7,8] | Code [9,10] | PWM 11 | PWM 14 | Code [15,16]

FIG. 23B

| PWM 1 | PWM 2 | PWM 3 | PWM 4 | PWM 5 | PWM 6 | PWM 7 | PWM 8 | PWM 9 | PWM 10 | PWM 11 | PWM 12 | PWM 13 | PWM 14 | PWM 15 | PWM 16 |

FIG. 25

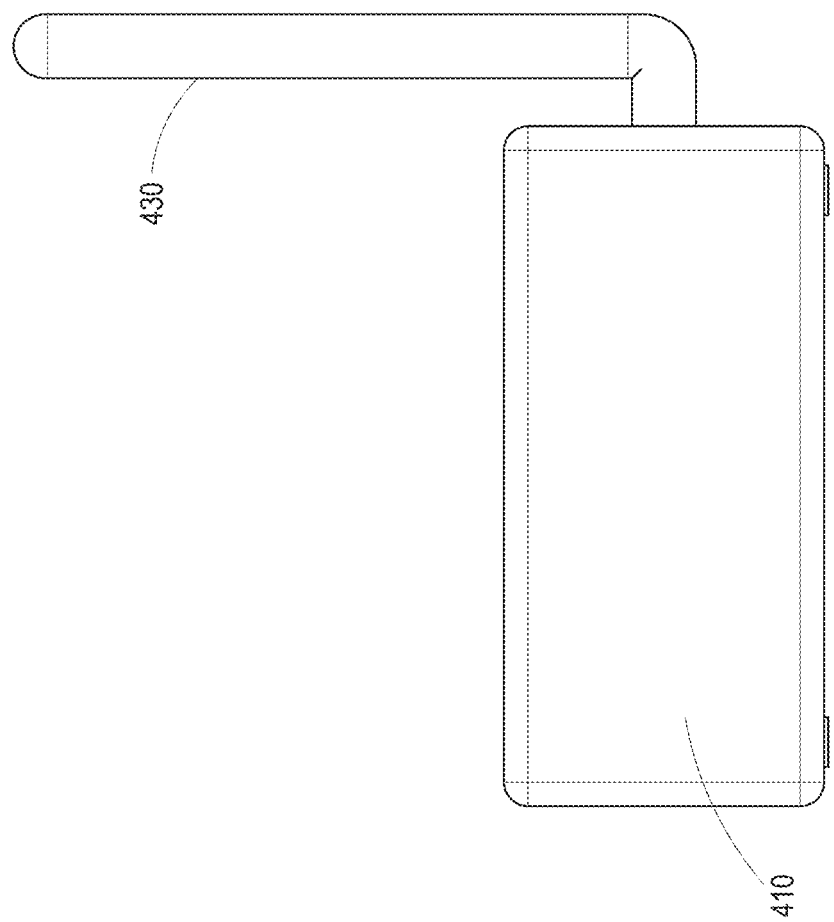

TAMPER-RESISTANT DATALINK COMMUNICATIONS SYSTEM

INCORPORATION BY REFERENCE TO ANY PRIORITY APPLICATIONS

This application is a continuation of U.S. patent application Ser. No. 17/732,306, filed on Apr. 28, 2022, which claims priority to and the benefit of Provisional Application No. 63/183,801 filed on May 4, 2021 in the U.S. Patent and Trademark Office, the entire contents of each of which are incorporated herein by reference.

BACKGROUND

Technical Field

The described technology generally relates to a tamper-resistant datalink communications system.

Description of Related Technology

Drones have been widely used in military operations due to the capability of remote control and autonomous flight along a designated route including a hazardous or non-safe area for military personnel. However, they recently have been used in various non-military areas such as transportation, security, broadcasting, sports games, etc. Furthermore, more and more private drones are also being utilized.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for tamper-resistant datalink communication.

One inventive aspect provides interference or tamper-resistance from malicious anti-drone systems that interfere with wireless communications between an operator ("pilot" or "robotic pilot") and their remotely operated drone ("robot", "computer", "autonomous system"). Embodiments of this disclosure may be described with reference to an "operator" providing commands for control of a remote drone. However, this disclosure is not limited to the operator being a pilot, for example, in various embodiments the operator can be a software application sitting on the cloud issuing commands (through different communications channels) to the remote drone (through a plurality of Internet or even RC channels, for example) processing an online order to communicate with the drone. The drone can include a receiving node configured to receive and reassemble the various commands and then issue the commands to the flight computer of the drone.

Another aspect can notify the operator if one or more of the datalinks is experiencing excessive data loss/corruption and latency.

Another aspect can select the next valid communications channel in the event that a channel is experiencing excessive data loss for a predefined period of time.

Another aspect can allow an agency (e.g., racing league events, federal communications commission (FCC), federal aviation administration (FAA), etc.) to notify the drone operator through a dedicated communications channel.

Another aspect can exchange data (e.g., video, telemetry, metadata, etc.) between the operator and drone across plurality of networks and channels (e.g., band, frequency, modulation, channel, etc.) to ensure data validity and likelihood of receipt.

Another aspect can reconstruct a valid communication sequence in the event that a channel is experiencing data loss, time-shifting, or data manipulation.

Another aspect can understand the nature of invalid communication (e.g., atmospheric interference, device malfunction, man-in-the-middle attack, communications relay, replay attack, etc.).

Another aspect can allow an agency (e.g., company, government, etc.) to see, understand and improve their methods of affecting the datalink.

Another aspect can send a copy of an identical message across different communications paths from operator to drone ("outlink"). The outlink communications paths can include a set of transmitters (located in parallel, near the operator) and matching receivers (in parallel, located on the drone). In general, the operator sends a command message to the drone. For example, the drone transmits a copy of the command packets it receives, and these commands travel down different communications paths in order to arrive at the operator.

Another aspect is a tamper-resistant datalink communications system comprising: a ground-based communications module configured to be coupled to a radio controller configured to remotely control a drone comprising a plurality of actuators; and a remote-mounted communications module configured to communicate data with the ground-based communications module, the remote-mounted communications module configured to be coupled to the drone, the ground-based communications module comprising: a ground processor configured to: receive a plurality of first signals each modulated with a first modulation scheme from the radio controller, convert the plurality of first signals to a second signal modulated with a second modulation scheme different from the first modulation scheme, and generate a plurality of second duplicated signals comprising two or more duplicated signals of the second signal; a plurality of ground transmitters configured to operate in different frequencies and respectively transmit the plurality of second duplicated signals to the remote-mounted communications module; and a plurality of ground receivers each configured to receive a verification signal, from the remote-mounted communications module, indicating that the plurality of first signals have been successfully retrieved by the remote-mounted communications module, the remote-mounted communications module comprising: a plurality of remote receivers configured to respectively receive the plurality of second duplicated signals from the ground-based communications module; a remote processor configured to: compare the plurality of second duplicated signals, restore the second signal based on the comparison, convert the restored second signal to the plurality of first signals, and control the plurality of actuators of the drone respectively with the plurality of first signals; and a plurality of remote transmitters each configured to transmit the verification signal to the ground-based communications module.

In some embodiments, the remote processor is configured to restore the second signal in response to determining that at least two of the plurality of second duplicated signals are the same as each other.

In some embodiments, the remote processor is configured to determine the second signal has been interfered, tampered, or modified in response to determining that at least one of the plurality of second duplicated signals is different from the remaining second duplicated signals.

In some embodiments, the verification signal comprises the plurality of second duplicated signals respectively sent by the plurality of remote transmitters.

In some embodiments, the first modulation scheme is pulse width modulation (PWM) and the second modulation scheme is pulse position modulation (PPM).

In some embodiments, each of the plurality of second duplicated signals comprises one or more PPM frames each including a plurality of PWM frames having the same number of the one or more actuators of the drone, the remote processor configured to control the one or more actuators respectively with the plurality of PWM frames.

In some embodiments, each of the plurality of ground transmitters is configured to be programmed to add one or more additional frequency hopping channels configured to operate in different frequencies.

Yet another aspect is a tamper-resistant datalink communications system comprising: a ground-based communications module configured to be coupled to a radio controller configured to remotely control a drone comprising a plurality of actuators, the ground-based communications module comprising: a ground processor configured to: receive a plurality of first signals each modulated with a first modulation scheme from the radio controller, convert the plurality of first signals to a second signal modulated with a second modulation scheme different from the first modulation scheme, and generate a plurality of second duplicated signals comprising two or more duplicated signals of the second signal; a plurality of ground transmitters configured to operate in different frequencies and respectively transmit the plurality of second duplicated signals to the drone, the number of the plurality of ground transmitters being the same as the number of the plurality of second duplicated signals, the plurality of first signals configured to respectively control the plurality of actuators of the drone; and a plurality of ground receivers configured to communicate data between the drone and the ground processor.

In some embodiments, at least one of the plurality of ground receivers is configured to receive a verification signal, from the drone, indicating that the plurality of first signals have been successfully retrieved by the drone.

In some embodiments, the ground processor is configured to provide a transmission error signal in response to determining that the verification signal is not received for a predetermined period of time.

In some embodiments, at least one of the plurality of ground transmitters is configured to be programmed to add one or more additional frequency hopping channels configured to operate in different frequencies.

In some embodiments, each of the plurality of ground transmitters is configured to be programmed to add one or more additional frequency hopping channels configured to operate in different frequencies, and wherein the one or more additional frequency hopping channels added to one of the plurality of ground transmitters are configured to operate in one or more first frequencies that are different from any of frequencies operating in the remaining ones of the plurality of ground transmitters.

In some embodiments, the ground-based communications module is configured to be wirelessly coupled to the remote controller.

In some embodiments, the ground-based communications module is configured to be physically coupled to a designated area in the remote controller.

In some embodiments, the ground-based communications module comprises a user interface configured to provide a status or quality of communication channels used by the plurality of ground transmitters.

Still yet another embodiment is a tamper-resistant datalink communications system comprising: a remote-mounted communications module configured to communicate data with a remote controller configured to remotely control a drone comprising a plurality of actuators, the remote-mounted communications module comprising: a plurality of remote receivers configured to respectively receive a plurality of duplicate signals of a second signal from the remote controller, each of the plurality of second duplicated signals comprising a plurality of first signals modulated with a first modulation scheme, each of the plurality of second duplicated signals modulated with a second modulation scheme different from the first modulation scheme; a remote processor configured to: compare the plurality of second duplicated signals, restore the second signal based on the comparison, convert the restored second signal to the plurality of first signals, and control the plurality of actuators of the drone respectively with the plurality of first signals; and a plurality of remote transmitters configured to communicate data between the remote processor and the remote controller.

In some embodiments, at least one of the remote transmitters is configured to transmit a verification signal, to the remote controller, indicating that the plurality of first signals have been successfully retrieved by the remote-mounted communications module.

In some embodiments, the verification signal comprises the plurality of second duplicated signals respectively sent by to the plurality of remote transmitters.

In some embodiments, the remote processor is configured to restore the second signal in response to determining that at least two of the plurality of second duplicated signals are the same as each other.

In some embodiments, the remote processor is configured to determine the second signal has been interfered, tampered, or modified in response to determining that at least one of the plurality of second duplicated signals is different from the remaining second duplicated signals.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system. Furthermore, any aspect of a system can be configured to perform a method of another aspect.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 23A is another example sequence of PWM data frames to be sent to the remote-mounted communication module according to some embodiments.

FIG. 23B is another example sequence of PWM data frames to be sent to the remote-mounted communication module according to some embodiments.

FIG. 25 is an example sequence of PWM data frames that have been restored in the remote-mounted communication module according to some embodiments.

FIG. 27A-FIG. 27G show another example exterior designs of the ground-based module or the remote-mounted module.

DETAILED DESCRIPTION

Provided herein are various embodiments of systems and methods for tamper-resistant datalink communications. Some embodiments provide an advanced datalink for providing drone interference and tamper detection so as to protect drones from unauthorized hacking or unwanted interference. For example, the tamper-resistant datalink communications system can include a ground-based communications module to be coupled to a radio controller and a remote-mounted communications module to be coupled to a drone, each module including two or more transmitters operating in different frequencies and two or more receivers operating in different frequencies for enhanced communication. The ground-based communications module may include two or more transmitters communicating data with receivers of the remote-mounted communications module using different frequencies and two or more receivers communicating data with transmitters of the remote-mounted communications module using different frequencies. The remote-mounted communications module may include two or more transmitters communicating data with the receivers of the ground-based communications module using different frequencies and two or more receivers communicating data with the transmitters of the ground-based communications module using different frequencies. By effectively detecting interference and tamper attempts, drone operations can be successfully performed for their intended purpose. The tamper-resistant datalink communications system can also enhance privacy by protecting drone communications from unauthorized or unwanted hacking.

In the following description, for purposes of explanation, numerous specific details are set forth in order to provide a thorough understanding of the various embodiments. It will be evident, however, to one of ordinary skill in the art that the various embodiments may be practiced without these specific details.

Figure 1A:
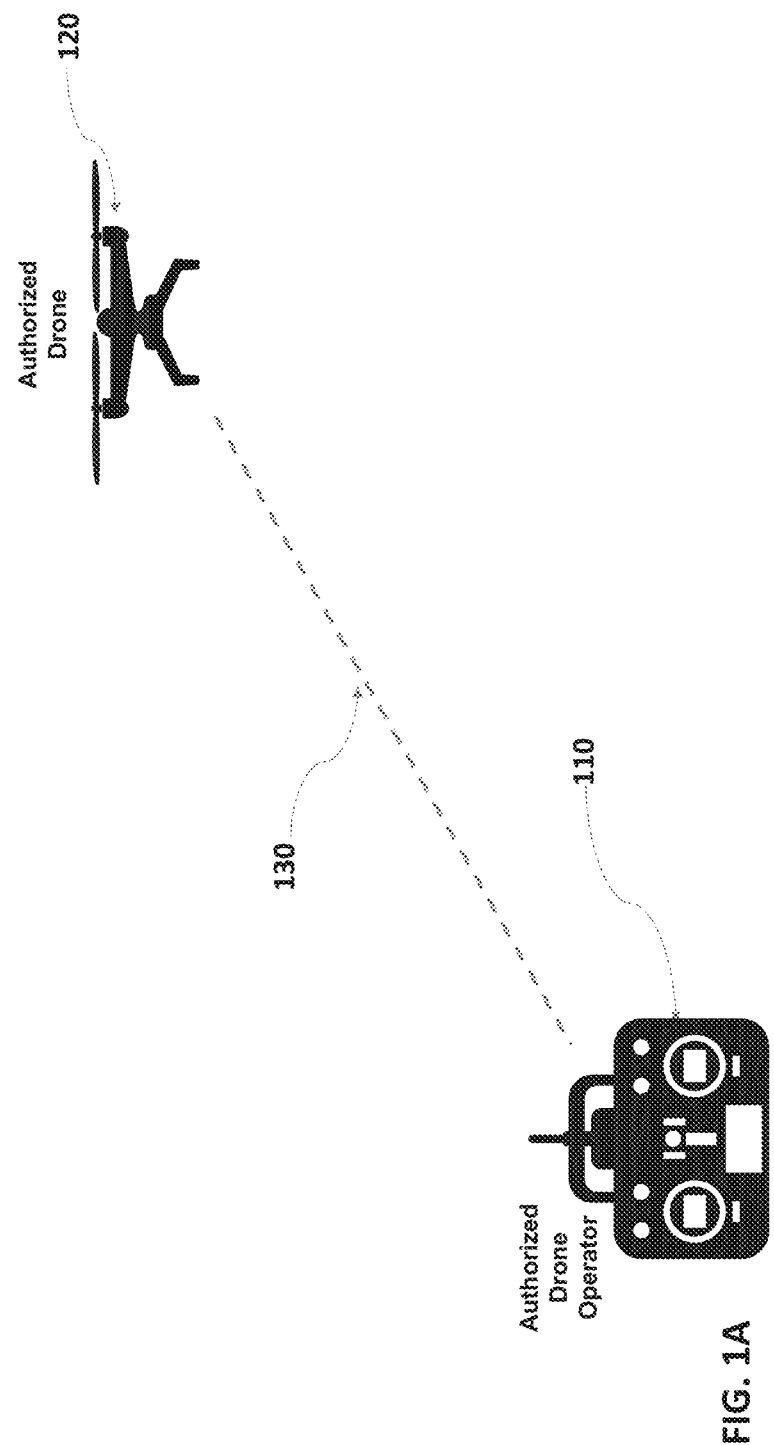
FIG. 1A is a drone communication system on a single wireless frequency.

FIG. 1A is a drone communication system 15 on a single wireless frequency. The drone communication system 15 includes a remote radio controller 110 and a drone 120. The remote radio controller 110 may be operated by an authorized drone operator. The remote radio controller 110 may communicate data with the drone 120 using a single wireless frequency or a single data link 130.

Figure 1B:
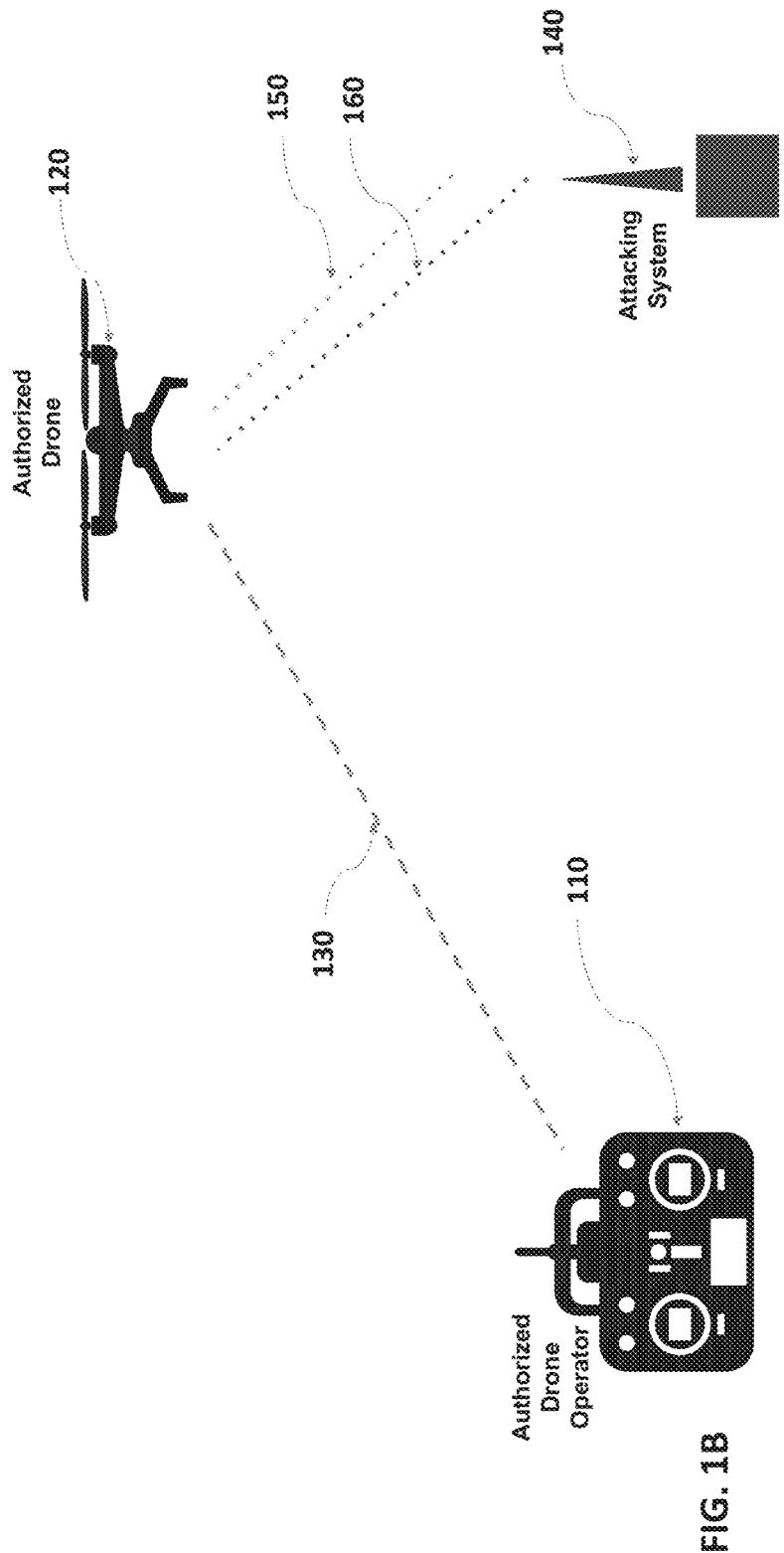
FIG. 1B is the drone communication system of FIG. 1A tampered by a drone attacking system.

FIG. 1B is the drone communication system of FIG. 1A tampered by a drone attacking system 140. The attacking system 140 may transmit one or more radio frequency signals 150 and 160 to interfere, tamper or otherwise modify the valid communication channel 130 or data transmitted via the channel 130. Since the remote radio controller 110 and the drone 120 communicate data using the single wireless frequency or the single data link 130, they are prone to interference or hacking by the attacking system 140. Thus, there is a need for an advanced datalink for drone communications that are resistant to interference and hacking.

Figure 2:
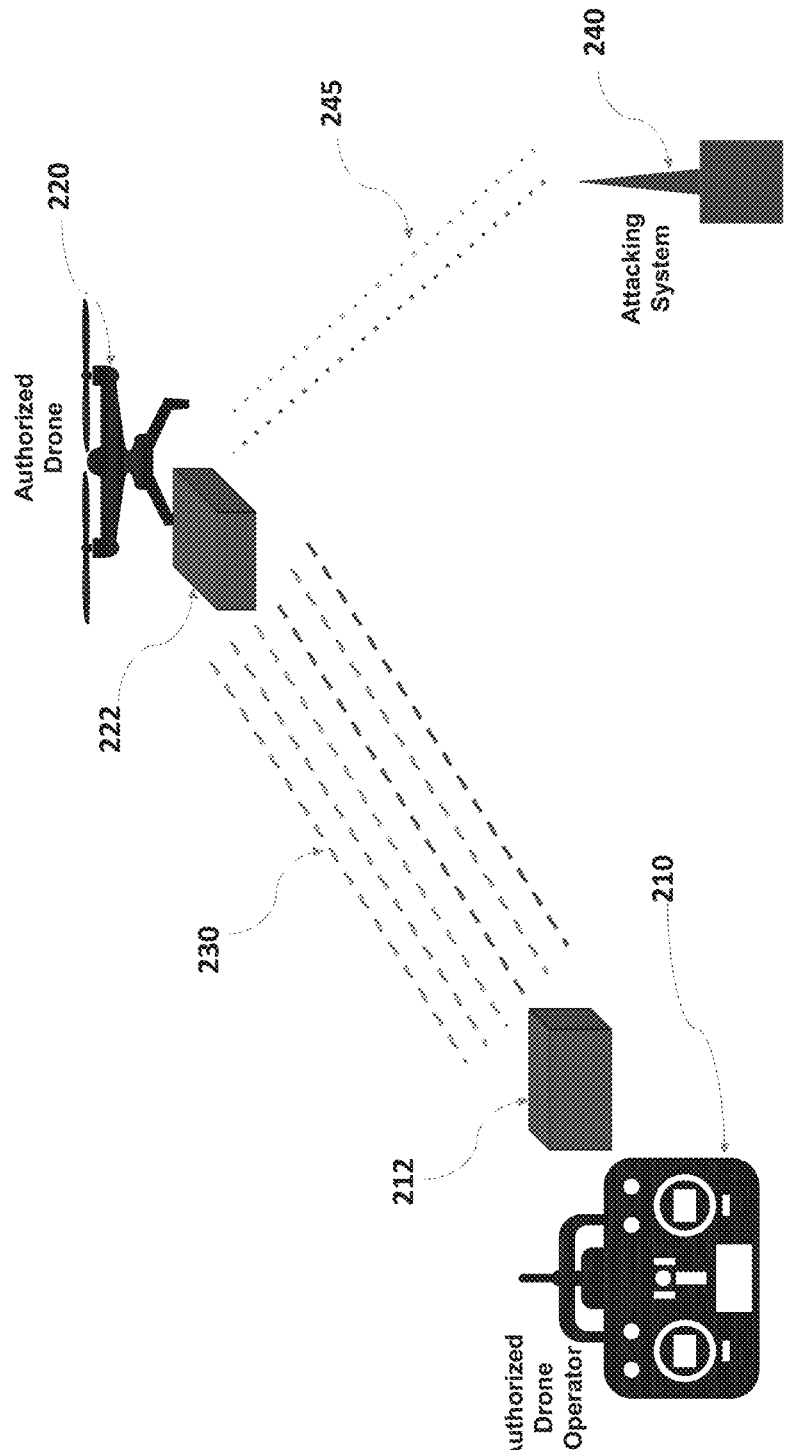
FIG. 2 is an example tamper-resistant datalink communications system according to some embodiments.

FIG. 2 is an example tamper-resistant datalink communications system 25 according to some embodiments. The tamper-resistant datalink communications system 25 may include a remote radio controller 210 and a drone 220. The remote radio controller 210 may be operated by an authorized drone operator. The authorized drone operator may own or otherwise have the authority to operate the drone 220. The drone 220 may be an authorized drone that can properly and/or legally communicate data with the remote radio controller 210. The tamper-resistant datalink communications system 25 may include a ground-based communications module 212 configured to be coupled to the radio controller 210 and a remote-mounted communications module 222 configured to be coupled to the drone 220.

Each of the ground-based communications module 212 and the remote-mounted communications module 222 may include two or more transmitters operating in different frequencies and two or more receivers operating in different frequencies for enhanced communication. The ground-based module 212 may include two or more transmitters communicating data with receivers of the remote-mounted module 222 using different frequencies and two or more receivers communicating data with transmitters of the remote-mounted module 222 using different frequencies. Similarly, the remote-mounted module 222 may include two or more transmitters communicating data with the receivers of the ground-based module 212 using different frequencies and two or more receivers communicating data with the transmitters of the ground-based module 212 using different frequencies. For example, referring to FIG. 2, the ground-based module 212 and the remote-mounted module 222 communicate data via two or more communication channels or links 230. Even though FIG. 2 shows six communication channels, the present disclosure is not limited thereto. For example, the tamper-resistant datalink communications system 25 may include less than or more than six communication channels. In some embodiments, at least one of the transmitters may be programmed to add two or more additional sub-frequency channels by frequency hopping (to be described in detail).

An attacking system 240 may try to interfere, tamper or otherwise modify the communication between the remote controller 210 and the drone 220 by transmitting one or more radio frequency signals 245. However, since two or more communication channels 230 are used to communicate data between the ground-based module 212 and the remote-mounted module 222, even if one channel is tampered, the two modules 212 and 222 can successfully communicate data with each other using one or more of the remaining datalinks. By effectively detecting interference and tamper attempts, drone operations can be successfully performed for their intended purpose. The tamper-resistant datalink communications system 25 can also enhance privacy by protecting drone communications from unauthorized or unwanted hacking.

In some embodiments, each of the channels 230 may be for only a downlink transmission or for only a uplink transmission. In these embodiments, each of the ground-based communications module 212 and the remote-mounted communications module 222 includes transmitters and receivers. For example, each of the modules 212 and 222 may include three transmitters and three receivers. However, the present disclosure is not limited thereto. Each of the modules 212 and 222 may include two pairs of transmitters and receivers, or more than three pairs of transmitters and receivers.

In other embodiments, each of the channels 230 may be for a bi-directional data link. In these embodiments, each of the ground-based module 212 and the remote-mounted module 222 includes two or more transceivers. For example, each of the ground-based module 212 and the remote-mounted module 222 may include six transceivers. However, the present disclosure is not limited thereto. Each of the modules 212 and 222 may include less than or more than six transceivers.

In some embodiments, the ground-based communications module 212 may be separately provided and attached to the remote controller 210. In other embodiments, the ground-based communications module 212 may be incorporated into or integrally formed with the remote controller 210. The ground-based module 212 may be sized and shaped to be coupled to a designated area of the remote controller 210, for example, a backside thereof. However, the present disclosure is not limited thereto. For example, the ground-based module 212 may be coupled to other areas of the remote controller 210 such as front, upper, or lower areas thereof. Although FIG. 2 shows that the ground-based module 212 has a particular shape, that is only for illustration purpose, and the module 212 may have various shapes and/or sizes depending on the specification of the remote controller 210.

Each of the modules 212 and 222 may include a body and an adapter portion smaller than and protruding from the body. The adapter portion may be inserted into a designated area in the modules 212 and 222 for electrical connection. The designated area may include a groove or opening that is configured to receive the adapter portion. In some embodiments, the modules 212 and 222 may have substantially the same or similar shape or size. In other embodiments, the modules 212 and 222 may have different shapes and sizes.

In other embodiments, the ground-based module 212 may not be physically attached or coupled to the remote controller 210, instead the module 212 may be positioned near the remote controller 210 and wirelessly communicate data with the remote controller 210. In these embodiments, the ground-based module 212 may be disposed on a charging base or housed in a charging base that supplies or charges power.

In some embodiments, the remote-mounted communications module 222 may be separately provided and attached to the drone 220. In other embodiments, the remote-mounted module 222 may be incorporated into or integrally formed with the drone 220. In still other embodiments, the remote-mounted module 222 may be wirelessly connected to the drone 220. In these embodiments, the remote-mounted module 222 may be located near the ground-based module 212. The remote-mounted module 222 may be sized and shaped to attached to or incorporated into a designated area of the drone 220, for example, an upper thereof. However, the present disclosure is not limited thereto. For example, the remote-mounted module 222 may be attached to or incorporated into other areas of the drone 220 such as lower, front, or rear areas thereof. Although FIG. 2 shows that the remote-mounted module 222 has a particular shape, that is only for illustration purpose, and the module 222 may have various shapes and/or sizes depending on the drone 220.

Figure 3:
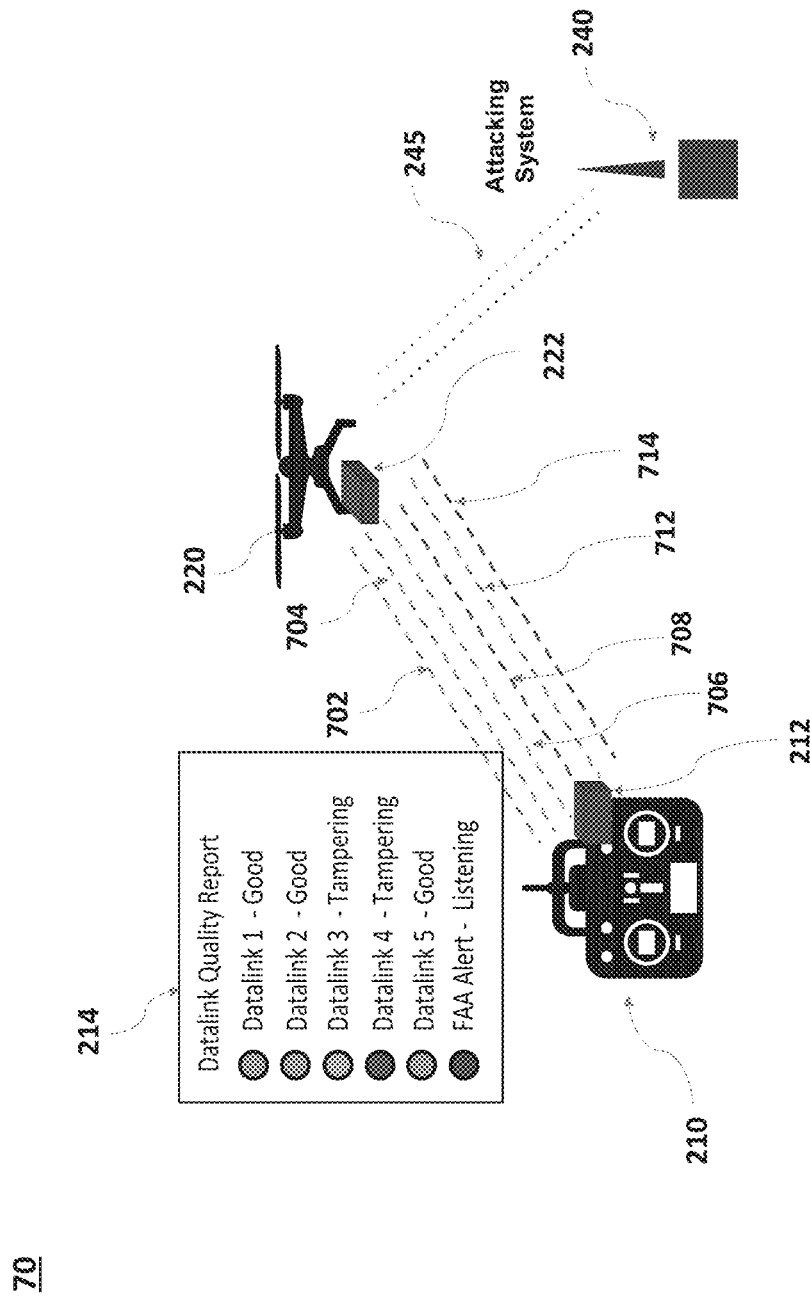
FIG. 3 is a conceptual diagram for explaining an example datalink concept in the tamper-resistant datalink communications system according to some embodiments.

FIG. 3 is a conceptual diagram 70 for explaining an example datalink concept in the tamper-resistant datalink communications system according to some embodiments.

The diagram 70 includes a datalink quality report 214, a radio controller 210 operated by an authorized drone operator, a ground-based communication module 212, an authorized drone 220, a remote-mounted communication module 222, and a drone attacking system 240.

The datalink quality report 214 may include datalink 1 (702), datalink 2 (704), datalink 3 (706), datalink 4 (708), datalink 5 (712), and a federal aviation administration (FAA) alert (714). In some embodiments, the datalink 1 (702), datalink 2 (704), and datalink 5 (712) may be indicated as good, and datalink 3 (706) and datalink 4 (708) may be indicated as tampering. The FAA alert link (714) may be optionally provided and thus can be omitted from the datalink quality report 214 depending on the application.

In some embodiments, the status of at least one datalink in the datalink quality report 214 may be provided by the ground-based communication module 212. For example, the ground-based module 212 may display the quality or status of one or more datalinks (702, 704, 706, 708, 712, 714). In these embodiments, the ground-based module 212 may display text (e.g., good, tampering, or listening, etc.) or blinking light indicating the status or quality of the links (e.g., green, orange, red, blue, etc.). The colors shown on the datalink quality report 214 are merely examples and the present disclosure is not limited thereto. As another example, the ground-based module 212 may provide an audio output indicating the quality or status of each of the datalinks. As another example, the ground-based module 212 may provide a haptic feedback indicating the quality or status of each of the datalinks. As another example, the ground-based module 212 may provide a combined output combining one or more of the visual (display), a haptic feedback, or an audio output indicating the quality of each of the datalinks. In other embodiments, the ground-based module 212 may communicate the datalink status information to a computing device (PC, laptop, smartphone, etc.) such that the computing device can provide the quality or status information about the datalinks. In other embodiments, the remote-mounted module 212 may also provide the datalink status information described above.

Figure 4:
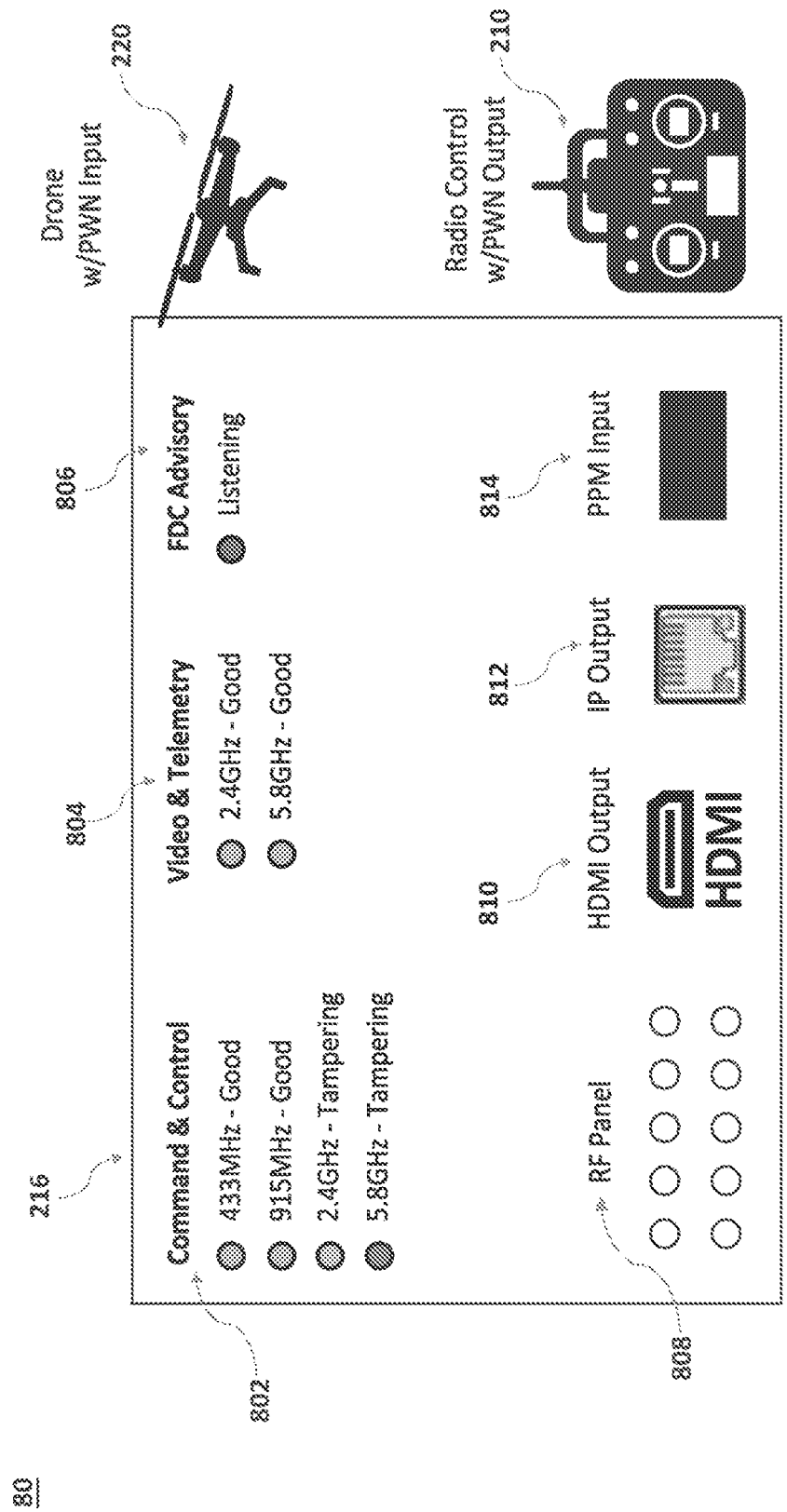
FIG. 4 is a conceptual diagram for explaining an example datalink user interface in the tamper-resistant datalink communications system according to some embodiments.

FIG. 4 is a conceptual diagram 80 for explaining an example datalink user interface in the tamper-resistant datalink communications system according to some embodiments. The diagram 80 may include a user interface 216, a drone 220, and a radio controller 210. The user interface 216 may include at least some of the datalink quality report shown in FIG. 3. The user interface 216 may be used for at least one of the remote controller 210 or the drone 220. The layout of the user interface 216 is merely an example and other layout or configuration is also possible. For example, one or more of the units of the user interface 216 may be omitted, combined into others, or another element may be added to the user interface 216. The user interface 216 may include a command and control section 802, a video & telemetry section 804, an FCC advisory section 806, an RF panel 808, an HDMI output 810, an IP output unit 812, and a PPM input section 814. Although not shown in FIG. 4, the user interface 216 may also include a PWM output section, and a PWM input section. The PWM input section may receive PWM frames from the remote controller 210. The PWM output section may output PWM frames to the drone 220.

The command & control section 802 shows that the 433 MHz channel and the 915 MHz channel are good, whereas the 2.4 GHz channel and the 5.8 GHz channel are tampering. The video & telemetry section 804 shows that both of the 2.4 GHz and 5.8 GHz channels are good. The FCC advisory section 806 indicates listening to an FCC alert. The above frequencies are merely examples, and the present disclosure is not limited thereto.

Figure 5:
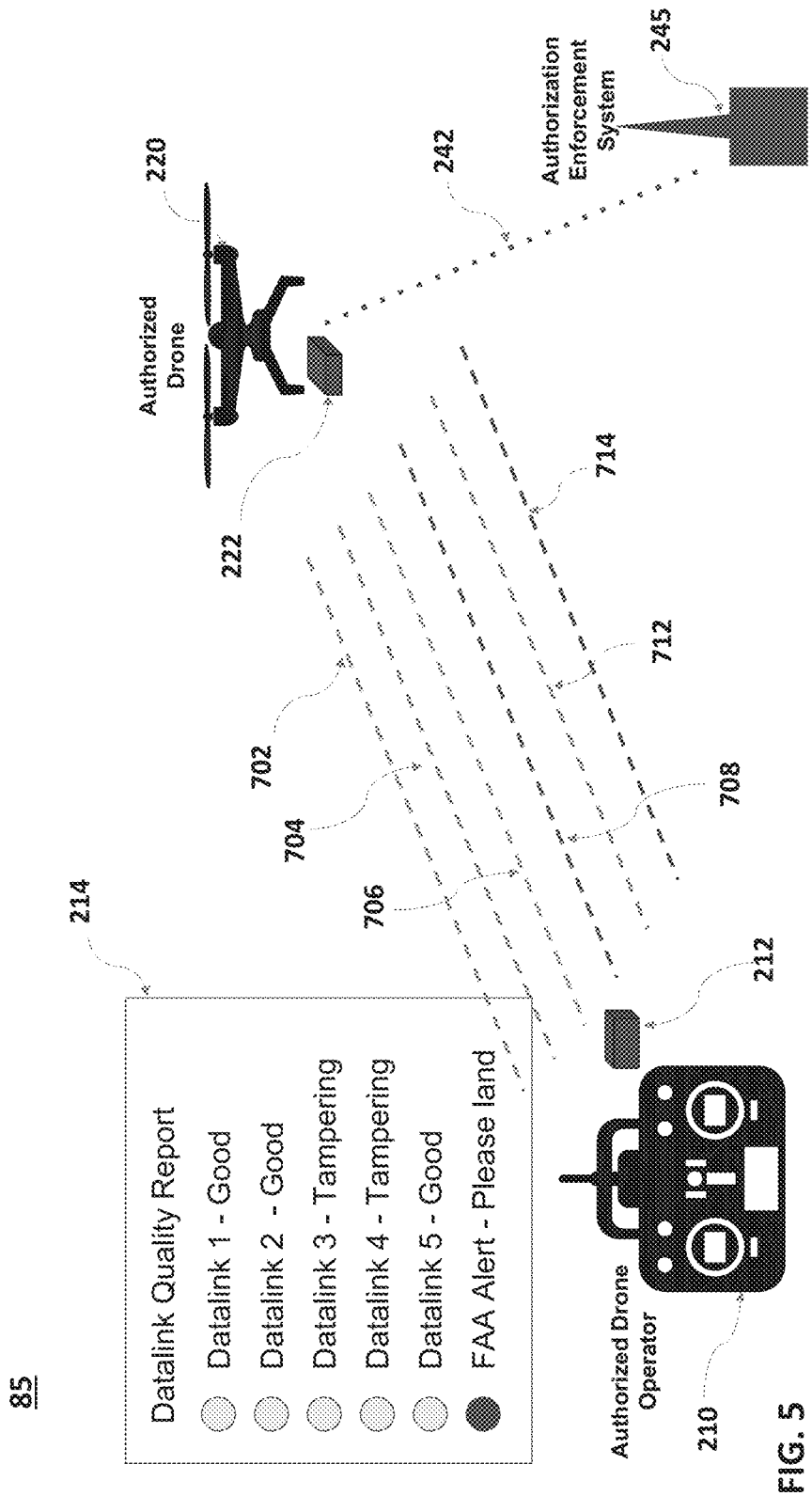
FIG. 5 is another conceptual diagram for explaining an example datalink concept in the tamper-resistant datalink communications system according to some embodiments.

FIG. 5 is another conceptual diagram 85 for explaining an example datalink concept in the tamper-resistant datalink communications system according to some embodiments. The diagram 85 is the same as the diagram 70 of FIG. 3 except that the diagram 85 includes an authorization enforcement system 245 instead of the attacking system 240. The authorization enforcement system 245 may be a system operated by a legally operating entity or a government agency such as FAA or FCC. The authorization enforcement system 245 may transmit a radio frequency signal 242 that may be legal or otherwise authorized under relevant law. For example, the radio frequency signal 242 may instruct the drone 220 to land.

Figure 6:
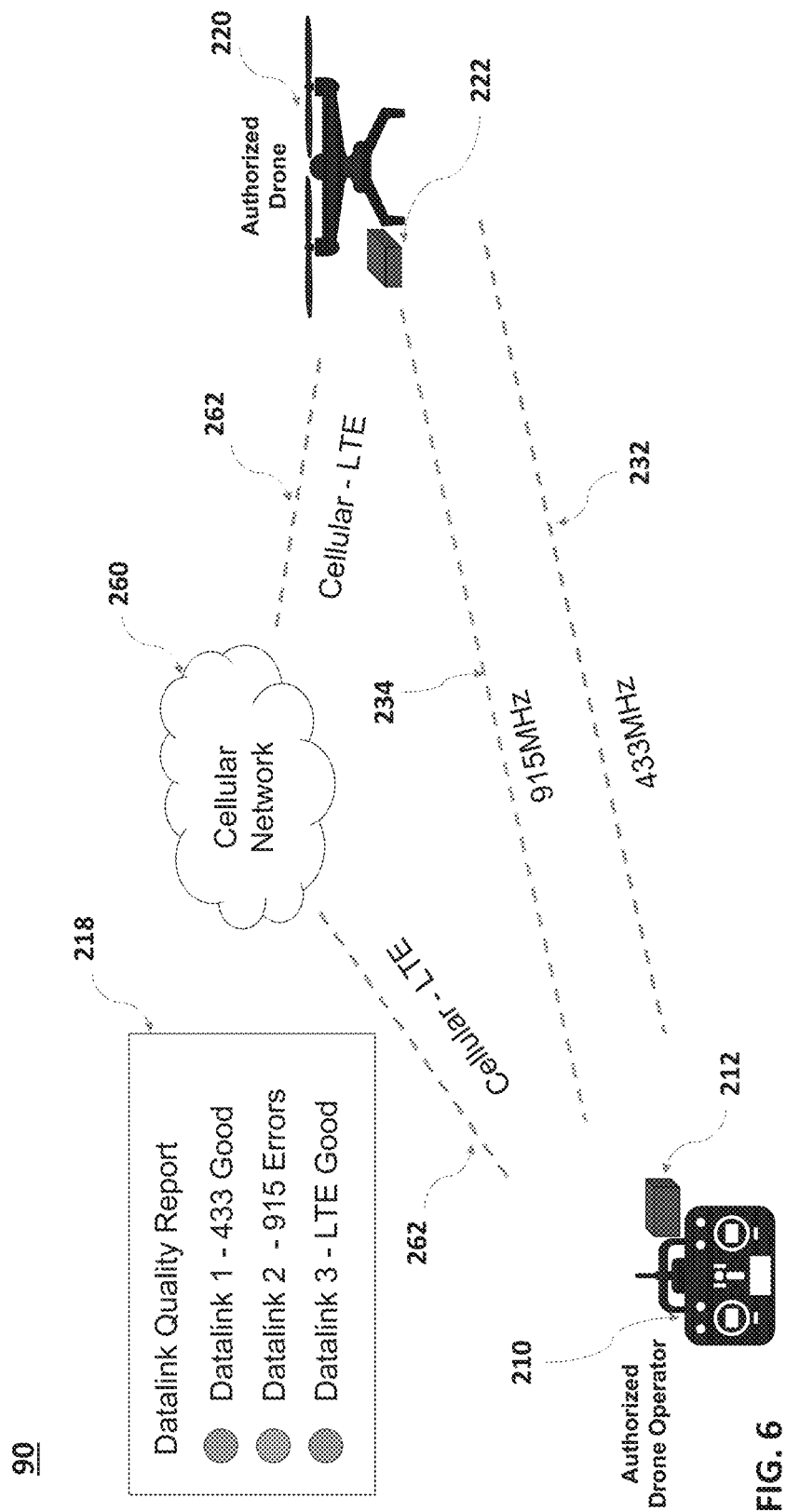
FIG. 6 is another conceptual diagram for explaining an example datalink concept in the tamper-resistant datalink communications system according to some embodiments.

FIG. 6 is another conceptual diagram 90 for explaining an example datalink concept in the tamper-resistant datalink communications system according to some embodiments. The diagram 90 includes a datalink quality report 218, a radio controller 210, a ground-based communication module 212, an authorized drone 220, a remote-mounted communication module 222, and a cellular network 260. The datalink quality report 218 may be used for at least one of the remote controller 210 or the drone 220. In the FIG. 6 embodiment, the ground-based module 212 and the remote-mounted module 222 may communicate data with each other via particular frequency channels such as 433 MHz or 915 MHz and the cellular network 260. Furthermore, at least one of the datalinks 232 and 234 may include one or more additional sub-channels created by frequency hopping.

The datalink quality report 218 may include datalink 1 (232), datalink 2 (234), datalink 3 (262). The datalink 1 (232) and the datalink 2 (262) may be indicated as good, and the datalink 2 (234) may be indicated as errors or tampering. The cellular network 260 may be optional and thus can be omitted depending on the application. The diagram 90 indicates that even if one channel (e.g., datalink 2) is interfered, tampered, or modified, two datalinks (232, 262) can communicate data successfully. The diagram 90 is merely an example and the present disclosure is not limited thereto. For example, two or more cellular networks can be added. Furthermore, an additional network (WAN, WLAN) and/or a proprietary network can also be added instead of or in addition to the cellular network 260. Moreover, additional datalinks with different frequencies can also be added. Although FIG. 6 shows that communication via the cellular network 260 is successful, the cellular channel 262 may be tampered. In these embodiments, one or more additional datalinks may be added to secure at least two datalinks that are not interfered, tampered, or modified.

Figure 7:
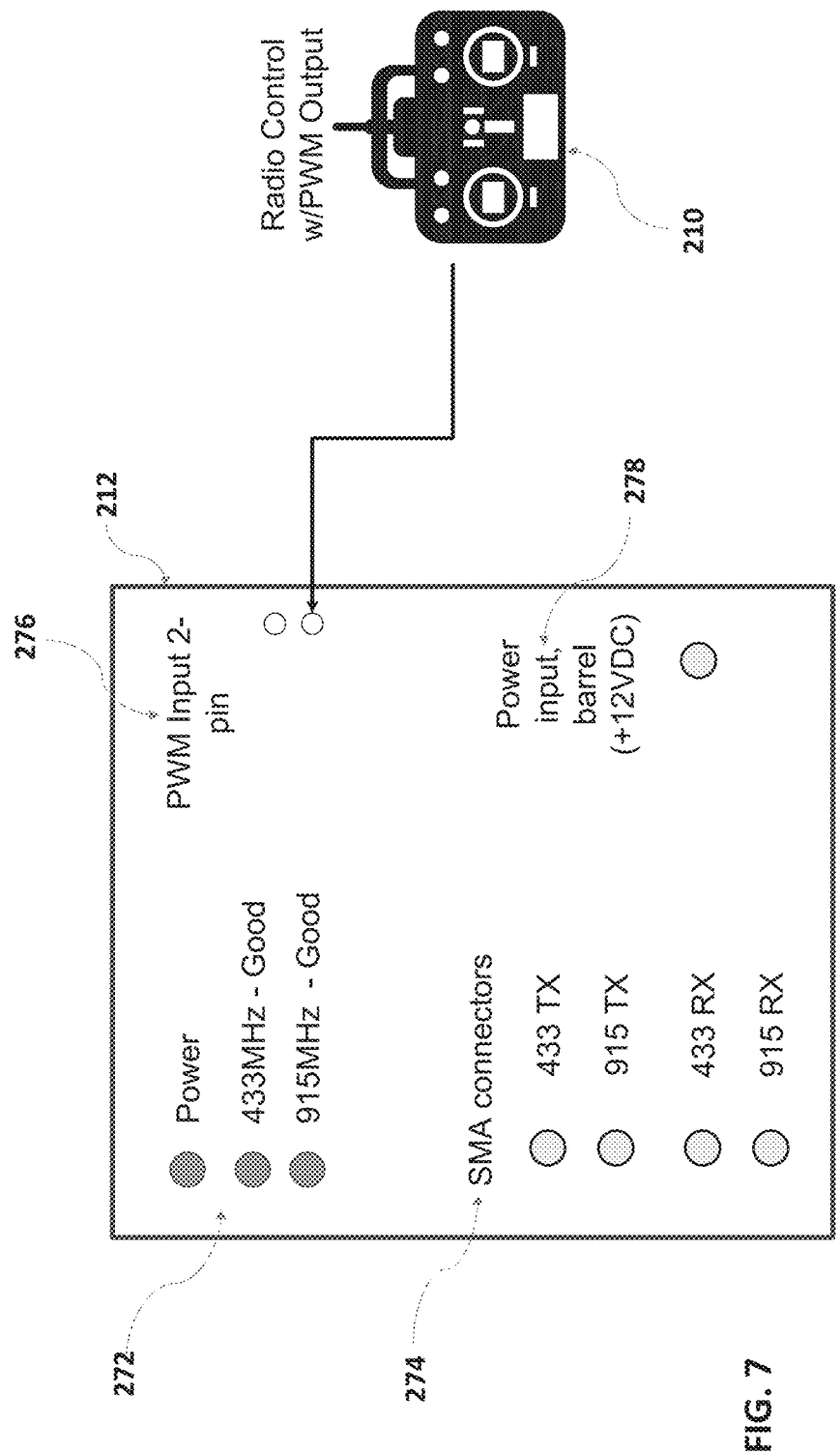
FIG. 7 is an example ground-based communication module communicating with a radio controller according to some embodiments.

FIG. 7 is an example layout of a ground-based communication module 212 communicating data with a radio controller 210 according to some embodiments. The ground-based module 212 may include a datalink status indicator 272, an antenna connector interface 274, a PWM input terminal 276, and a power input terminal 278. Since the PWM input terminal 276 may receive a plurality of PWM frames that can constitute one PPM frame, it can also be referred to as a PPM input terminal. FIG. 7 shows only example layouts of the ground-based communication module 212, and the present disclosure is not limited thereto. For example, certain elements may be modified or removed, and/or other elements or equipment may be added.

The datalink status indicator 272 may indicate the quality or status of the given datalink. For example, the datalink status indicator 272 indicates that both of the datalinks (433

MHz, 915 MHz) are good. The antenna connector interface 274 may indicate which transmitter or receiver (antenna) is currently installed or used. The antenna connector interface 274 may use a predetermined antenna connector interface, for example, SubMinature version A (SMA). However, the present disclosure is not limited thereto. Other antenna connection interface such as RF connector interface or other interface for wireless data communication can also be used. Although FIG. 7 shows only two datalinks, the present disclosure is not limited thereto. For example, three or more datalinks can also be used. The PWM input terminal 276 may be used to receive a PWM data stream from the remote controller 210. The PWM input terminal 276 may include one or more pins each of which can receive one PWM data stream from the remote controller 210. The power input terminal 278 may be used to receive power input. The power input terminal 278 may include one or more pins that can receive power.

Figure 8:
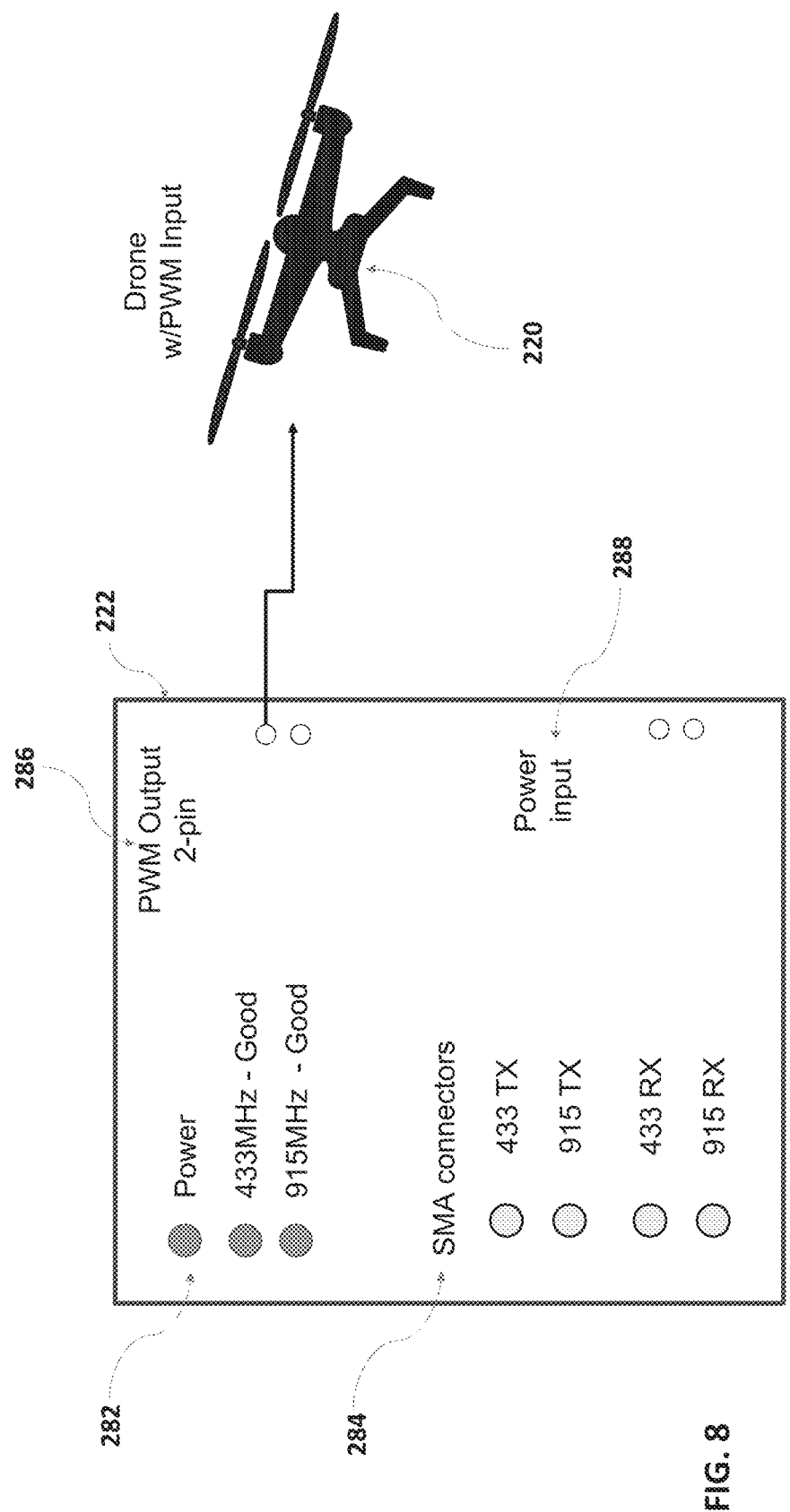
FIG. 8 is an example remote-mounted communication module communicating with a drone according to some embodiments.

FIG. 8 is an example layout of a remote-mounted communication module 222 communicating with a drone 220 according to some embodiments. FIG. 8 shows only example layouts of the remote-mounted communication module 222, and the present disclosure is not limited thereto. For example, certain elements may be modified or removed, and/or other elements or equipment may be added.

The remote-mounted module 222 may include a datalink status indicator 282, an antenna connector interface 284, a PWM output terminal 286, and a power input terminal 288. Since the PWM output terminal 286 may output a plurality of PWM frames that can constitute one PPM frame, it can also be referred to as a PPM output terminal.

The datalink status indicator 282 may indicate the quality or status of the given datalink. For example, the datalink status indicator 282 indicates that both of the datalinks (433 MHz, 915 MHz) are good. The antenna connector interface 284 may indicate which transmitter or receiver (antenna) is currently installed or used. The antenna connector interface 284 may use a predetermined antenna connector interface, for example, SubMinature version A (SMA). Although FIG. 8 shows only two datalinks, the present disclosure is not limited thereto. For example, three or more datalinks can also be used. The PWM output terminal 286 may be used to output PWM data stream, received from the ground-based communication module 212, to the drone 220. The PWM output terminal 286 may include one or more pins each of which can output one PWM data stream to a component (motor, servo, etc.) of the drone 220. The power input terminal 288 may be used to receive power input. The power input terminal 288 may include one or more pins that can receive power.

Figure 9:
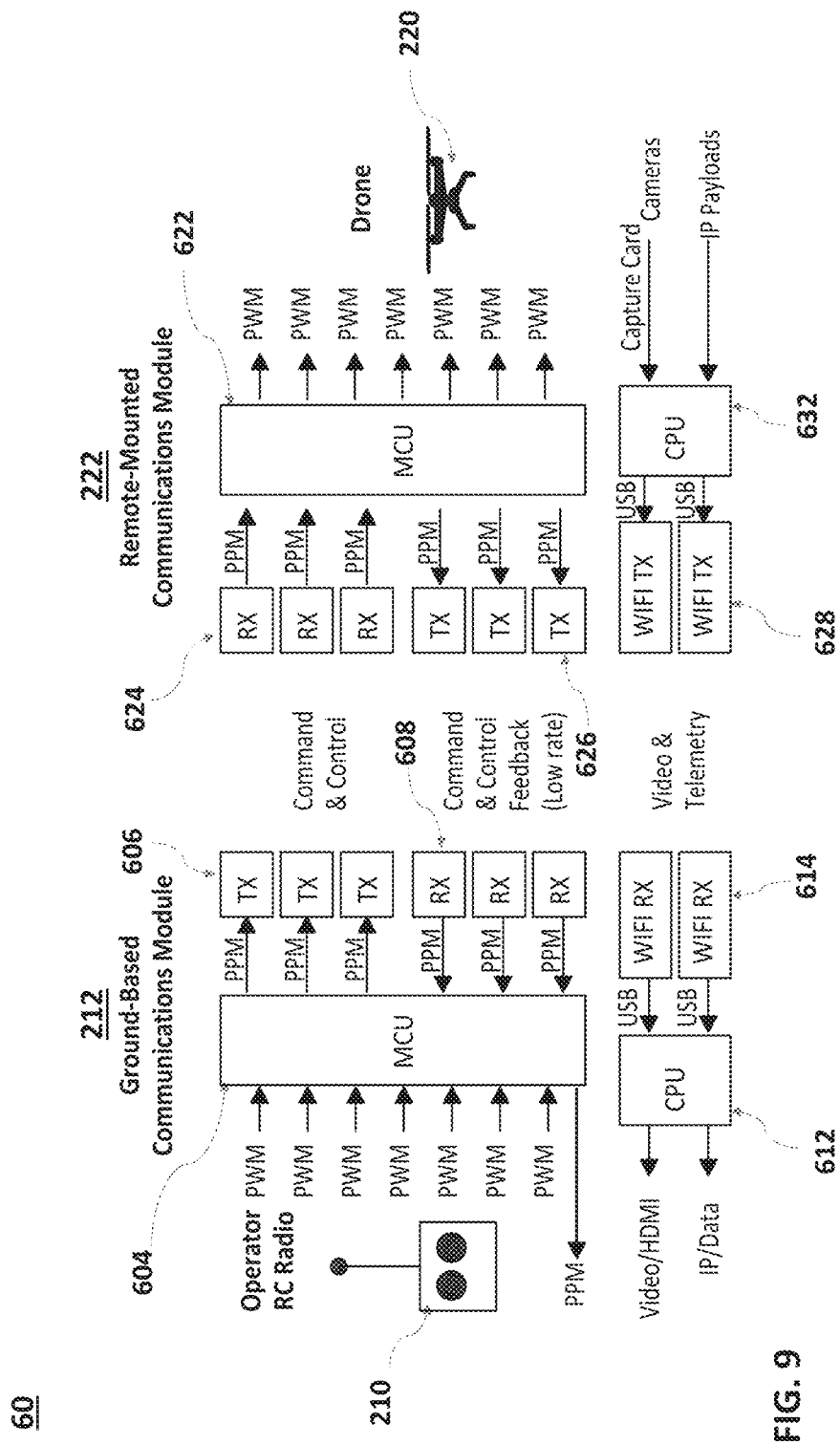
FIG. 9 is an example block diagram of the tamper-resistant datalink communications system according to some embodiments.

FIG. 9 is an example block diagram of the tamper-resistant datalink communications system 60 according to some embodiments. The system 60 shown in FIG. 9 is merely an example tamper-resistant datalink communications system, and certain elements may be modified or removed, and/or other elements or equipment may be added.

The system 60 may include an operator RC radio or remote controller 210, a ground-based communication module 212, a remote-mounted communication module 222, and a drone 220. At least some portion of each of the modules 212 and 222 can be implemented with software, hardware, firmware, or a combination thereof.

The ground-based module 212 can be coupled to the remote controller 210. As described above, the ground-based module 212 can be wirelessly connected or physically coupled to the remote controller 210. The ground-based module 212 can be attached to a designated region in the remote controller 210. The designated region of the remote controller 210 may include one or more connector pins that can engage one or more connector pins in the ground-based module 212 for electrical connection.

The remote-mounted communication module 222 can be coupled to the drone 220. Again, the remote-mounted module 222 can be wirelessly connected or physically coupled to the drone 220. The remote-mounted module 222 can be attached to a designated region in the drone 220. The designated region of the remote-mounted module 222 may include one or more connector pins that can engage one or more connector pins in the remote-mounted module 222 for electrical connection. The remote controller 210 can send commands to the ground-based module 212 which transmits the commands to the remote-mounted module 222 which controls the drone 220.

The ground-based module 212 may include a microcontroller or MCU 604, two or more transmitters 606, two or more receivers 608, one or more wireless receivers 614, and a controller (CPU) 612. Each of the transmitters 606 and receivers 608 can be tuned to a different frequency, modulation, bandwidth, channel, and/or port. The CPU 612 and the wireless receivers 614 may be optional and thus can be omitted.

The remote-mounted module 222 may include a microcontroller or MCU 622, two or more receivers 624, two or more transmitters 626, one or more wireless transmitters 628, and a controller (CPU) 632. Each of the transmitters 626 and receivers 628 can be tuned to a different frequency, modulation, bandwidth, channel, and/or port. The CPU 632 and wireless transmitters 628 may transmit video signals captured by the drone 220 to the ground-based module 212 so that the wireless receivers 614 and the CPU 612 in the ground-based module 212 can process the video signals. The CPU 632 and the wireless transmitters 628 may be optional and thus can be omitted.

In some embodiments, the two or more transmitters 606 of the ground-based communications module 212 may operate independently from each other. For example, the two or more transmitters 606 may transmit signals at different times from each other. In other embodiments, the two or more transmitters 606 may simultaneously communicate data with the two or more matching receivers 624 of the remote-mounted module 222. The two or more receivers 608 of the ground-based module 212 may also operate independently from each other. The two or more receivers 608 may simultaneously communicate with the two or more matching transmitters 626 of the remote-mounted module 222.

Similarly, the two or more transmitters 626 of the remote-mounted module 222 may operate independently from each other. For example, the two or more transmitters 626 may transmit signals at different times from each other. In other embodiments, the two or more transmitters 626 may simultaneously communicate data with the two or more matching receivers 608 of the ground-based module 212. In some embodiments, the two or more receivers 624 of the remote-mounted module 222 may also operate independently from each other. In other embodiments, the two or more receivers 624 may simultaneously communicate data with the two or more matching transmitters 606 of the ground-based module 212.

The MCU 604 of the ground-based module 212 may receive a plurality of first signals having a first format from the radio controller 210 and convert the plurality of first signals to a single second signal having a second format different from the first format. In some embodiments, the first signal may include a signal modulated with a pulse width modulation (PWM). However, the first signal may be modulated with another modulation scheme as long as it is modulated to be differently from the second signal. In some embodiments, the second signal may include a signal modulated with a pulse position modulation (PPM). However, the second signal may be modulated with another modulation scheme as long as it is modulated to be differently from the first signal. For the purpose of convenience, the description will be made mainly based on the first format being PWM and the second format being PPM.

Figure 20:
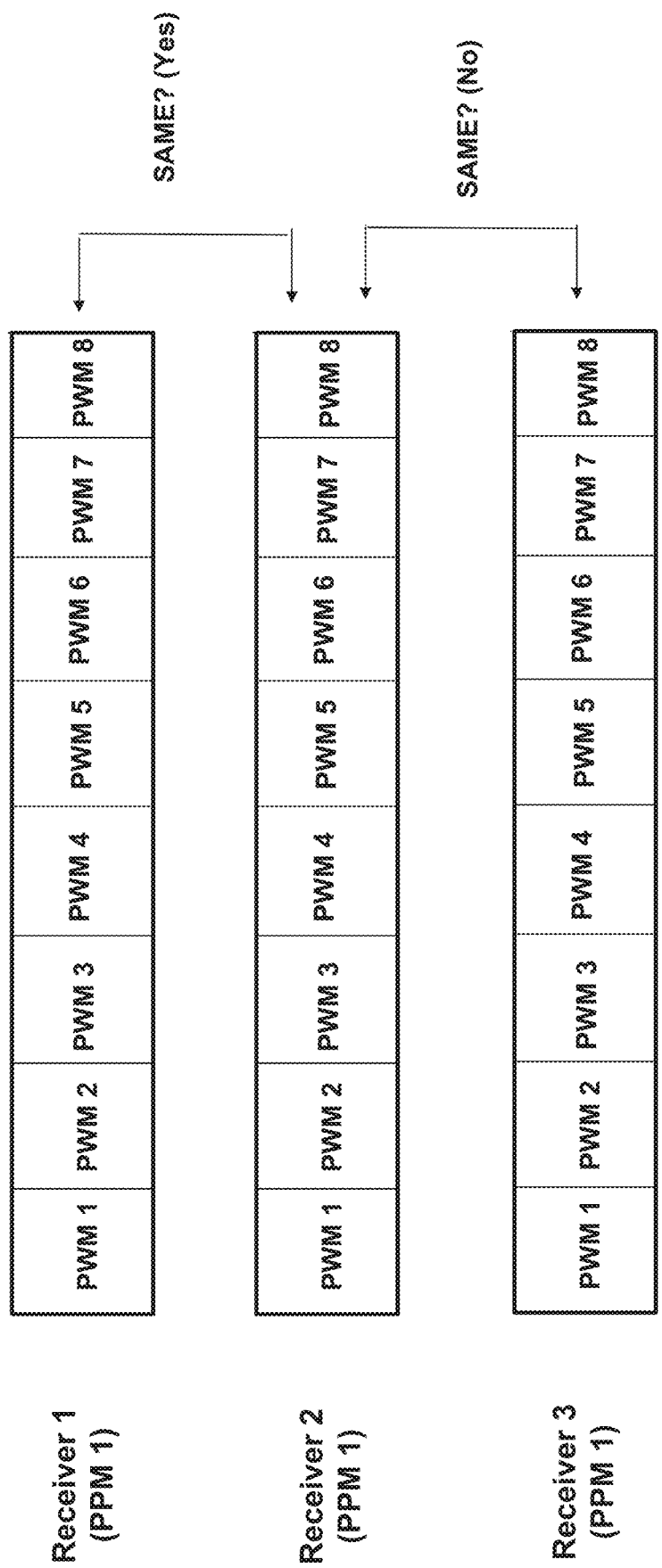
FIG. 20 is an example sequence of PWM data frames to be processed in the remote-mounted communication module according to some embodiments.

The MCU 604 may generate a plurality of second duplicated signals comprising two or more duplicated signals of the single second signal and control each of the transmitters 606 to transmit the plurality of second duplicated signals to the remote-mounted module 222 (see PPM 1, PPM 2, PPM 3 in FIG. 20).

The MCU 604 may also generate a plurality of transformed signals based on the plurality of first signals according to a transformation rule or algorithm. One example of the transformation rule may be using the concept of "redundant array of inexpensive disks" or "redundant array of independent disks" (RAID), which will be described in detail. In these embodiments, the MCU 604 may not necessarily duplicate the entirety of the first signals, instead control the transmitters to respectively transmit the plurality of transformed signals (see, e.g., FIG. 22). In some embodiments, the MCU 604 may also generate an error detection data frame (e.g., parity code) and control at least one of the transmitters to transmit all or part of the error detection data frame (see, e.g., FIG. 23A and FIG. 23B).

The MCU 604 may receive a plurality of PWM frames from the remote controller 210 and convert into a single PPM signal. The MCU 604 may include a PWM-PPM converter (not shown, but see a PPM-PWM converter 224 of the MCU 622 in the remote-mounted module in FIG. 13) that performs the PWM-PPM conversion. The MCU 604 may send the PWM signals to the remote-mounted module 222 via the transmitters 606.

The receivers 608 of the ground-based module 212 may also receive the valid command packet from the remote-mounted module 222. The valid command packet may include PPM 1 received by receiver 1 or receiver 2 of the remote-mount module 222 in FIG. 20 and validated by the MCU 622. The valid command packet may indicate that the remote-mounted module 222 has successfully retrieved the command packet sent by the ground-based module 212.

Figure 13:
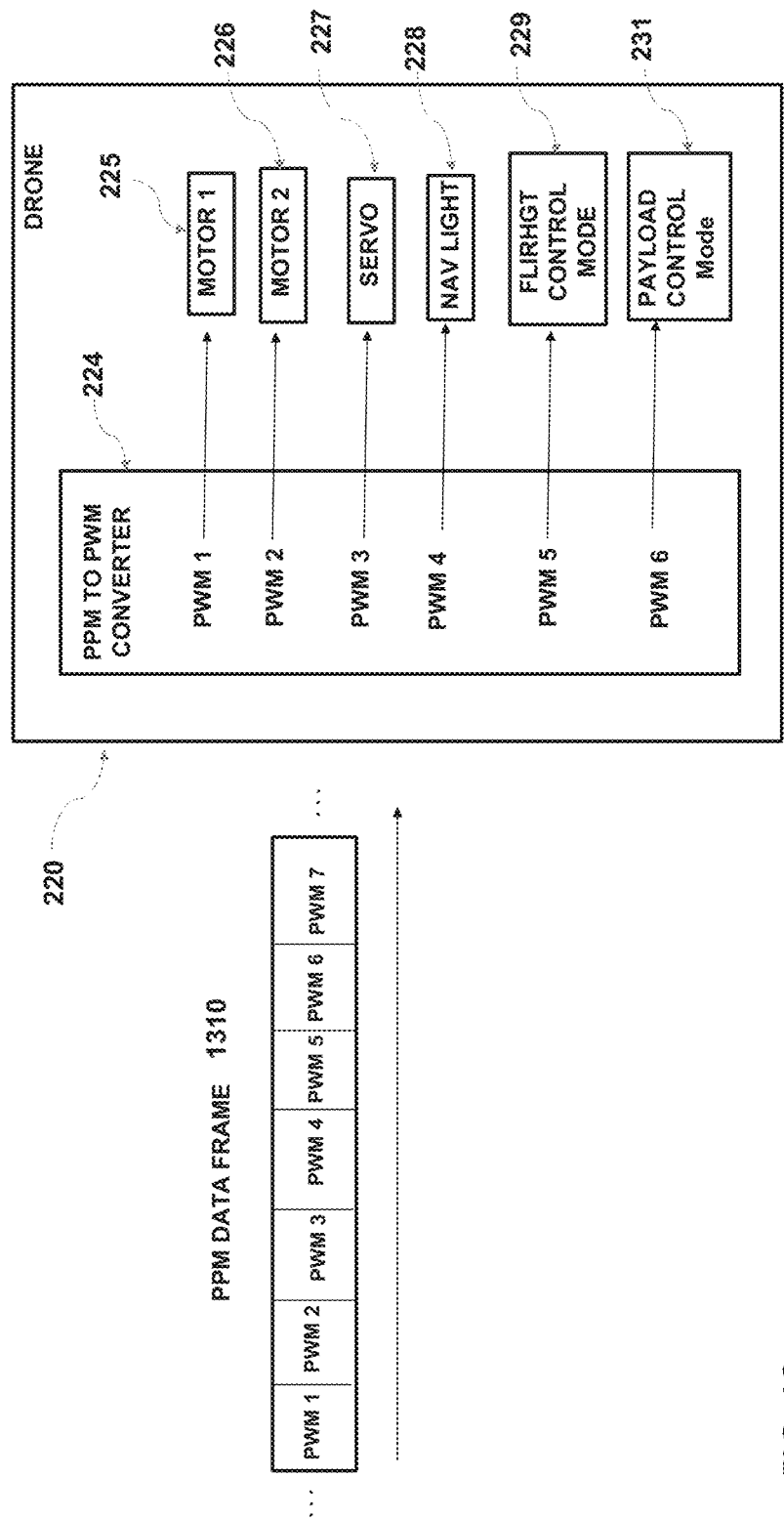
FIG. 13 is an example drone system including various components to be controlled by received PPM data frames each including multiple PWM signals according to some embodiments.

The MCU 622 of the remote-mounted module 222 may receive a PPM data stream including multiple PPM frames (see, for example, FIG. 18) from the ground-based module 212, convert each of the received PPM frames into a plurality of PWM signals, and control one or more components of the drone 220 (see, e.g., FIG. 13). The MCU 622 can read and compare the data received on each of the independent receivers 624. If the data packets received on multiple different receivers 624 are equivalent, plus or minus a variable time latency threshold, then the receivers 624 can be determined to be in agreement.

For example, the MCU 622 of the remote-mounted module 222 may receive and compare the PPM frames to determine whether the PPM frames are tampered, interfered, or modified. For example, the MCU 622 may compare the PPM frames to determine whether the PPM frames are the same. If they are the same, the MCU 622 may determine that there was no tampering or interfering, as the signals were not modified (see Receivers 1 and 2 in FIG. 22). Then, the MCU 622 may restore the PPM frames (original signals), and convert each of the restored PPM frames to a plurality of PWM frames, and control drone components (e.g., actuators) with the PWM frames.

Figure 22:
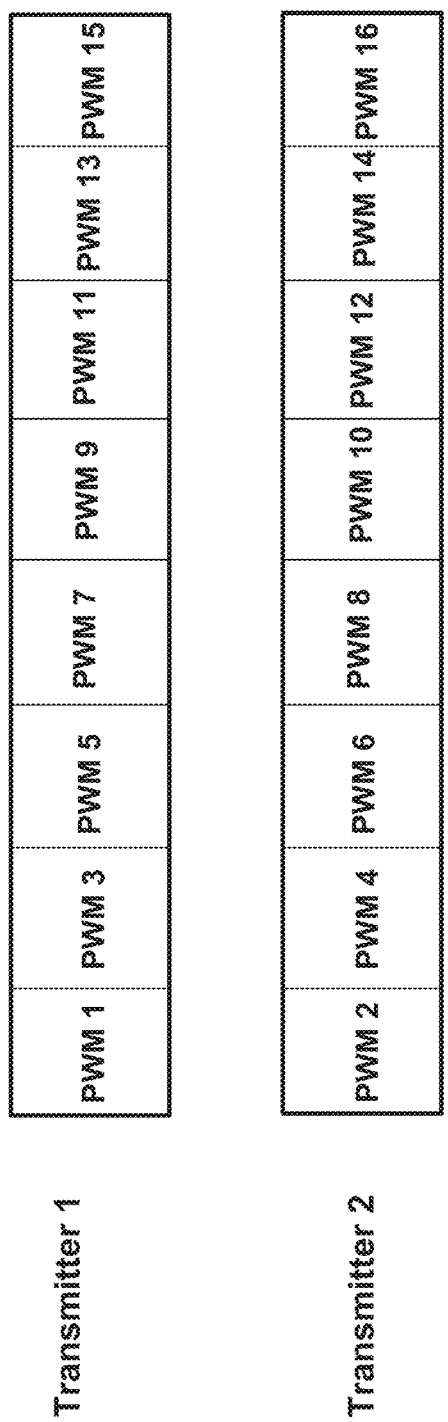
FIG. 22 is an example sequence of PWM data frames to be sent to the remote-mounted communication module according to some embodiments.

If the PPM frames are not the same, the MCU 622 may determine that there was tampering or interfering, as the signals were modified (see Receivers 2 and 3 in FIG. 22). In both of the scenarios, the MCU 622 may control the transmitters 626 to transmit a confirmation signal to the ground-based module 212. The confirmation signal may indicate whether or not the remote-mounted module 222 successfully retrieved the original command packet or not. In some embodiments, the MCU 622 may control the transmitters 626 to send the confirmation signal only if the remote-mounted module 222 successfully retrieved the original command packet. In other embodiments, the MCU 622 may control the transmitters 626 to send the confirmation signal only if the remote-mounted module 222 has not successfully retrieved the original command packet.

In some embodiments, the transmitters/receivers of each of the ground-based module 212 and the remote-mounted module 222 can be determined to be out of agreement if any transmitter/receiver (1) has data or data-validity characteristics that are not in agreement with the other transmitter/receivers, or (2) the message is delayed and exceeds a latency threshold. A transmitter/receiver that is not in agreement with other receivers can be indicated to the operator through the user-interface.

When the receivers are in agreement, the system can forward the operator's control packets to the drones' computer for processing and instruction. When receivers are out of agreement, the behavior of the system can be defined by the user based on their drone's specific mission. In some embodiments, this behavior may be predefined by the user prior to flight. For example, when the receivers are out of agreement, the system forwards the most-likely-valid control packets to the drone's computer based on the largest proportion of receivers that agree. In another example, when the receivers are out of agreement, the system can be configured to forward control packets to the drone's computer based on which receiver is defined to be the default. When the receivers are out of agreement and the most-likely-valid control packet cannot be determined, the system can output failsafe values, which are pre-defined output control states, which can be defined by the user.

Figure 10:
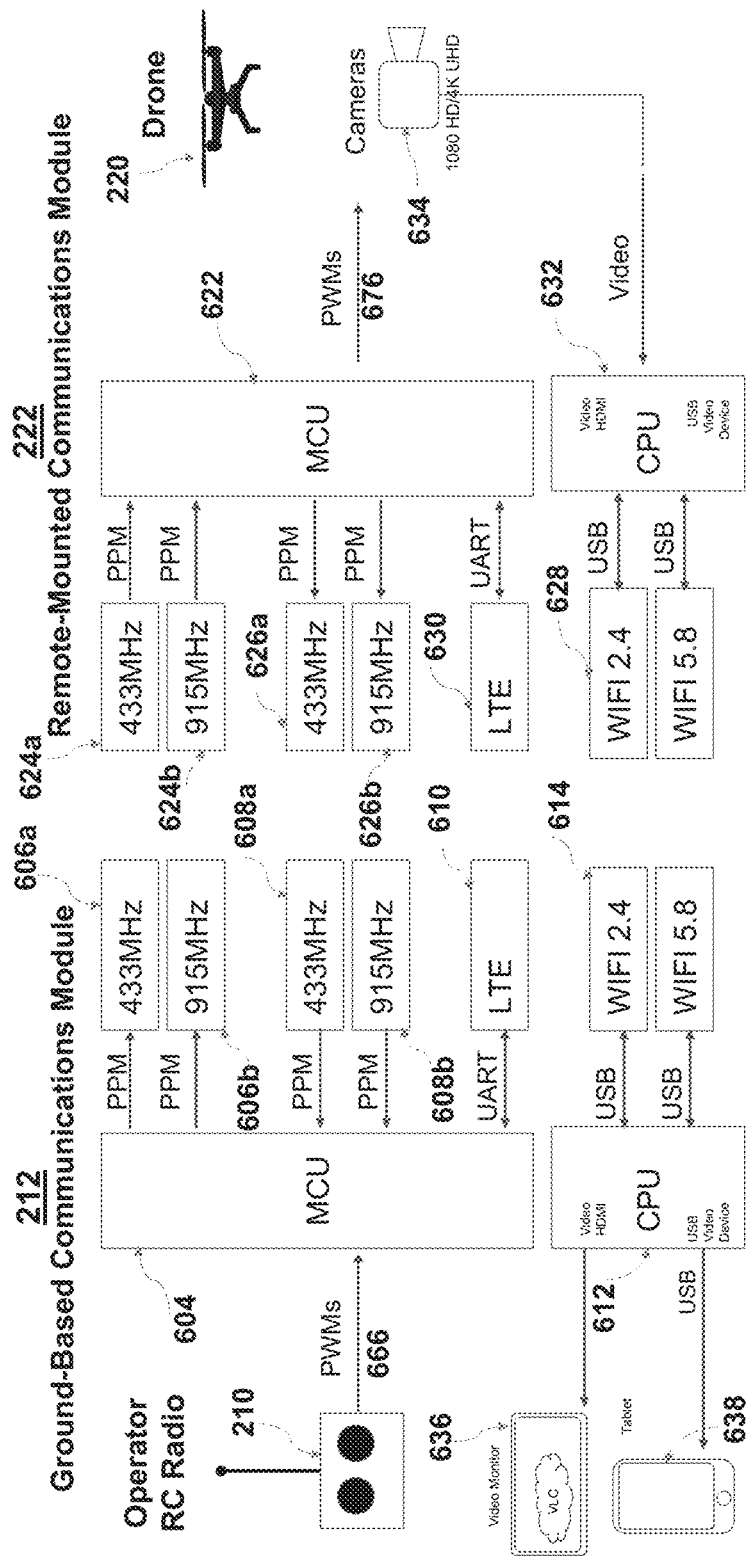
FIG. 10 is another example block diagram of the tamper-resistant datalink communications system according to some embodiments.

FIG. 10 is another example block diagram of the tamper-resistant datalink communications system 65 according to some embodiments. The tamper-resistant datalink communications system 65 may correspond to the diagram 90 shown in FIG. 6. The FIG. 10 embodiment is similar to the FIG. 9 embodiment except that each of the ground-based module 212 and the remote-mounted module 222 includes two transmitters (606*a*/606*b*, 626*a*/626*b*) and two receivers (608*a*/608*b*, 624*a*/624*b*), and LTE transceivers (610, 630). Similar to the FIG. 9 embodiment, the MCU 604 of the ground-based module 212 may receive a plurality of PWM frames 666 and generate duplicate PPM frames each PPM frame including the plurality of PWM frames 666.

Furthermore, the MCU 622 of the remote-mounted module 222 may receive the duplicate PPM frames, restore the plurality of PWMs 676 and control drone components based on the restored plurality of PWMs 676.

The LTE transceivers 610 and 630 may handle LTE signals transmitted via the LTE network 260 (see FIG. 6). The LTE transceivers 610 and 630 may use a wireless interface such as a universal asynchronous receiver-transmitter (UART) interface.

The drone 220 may include one or more cameras 634 that can capture an image and transmit the captured image to the CPU 632 which processes and sends to the wireless transmitters 628 that subsequently send the captured image to the wireless receivers 614. The CPU 612 may process the received image and provide to a computing device such as a tablet or PC 638, or a video monitor 636 that can display the received image. Again, the cameras 634, the CPU 632, the wireless transmitters 628, the wireless receivers 614, and the CPU 612, and the computing devices 636 and 638 may be optional and thus can be omitted.

Figure 11:
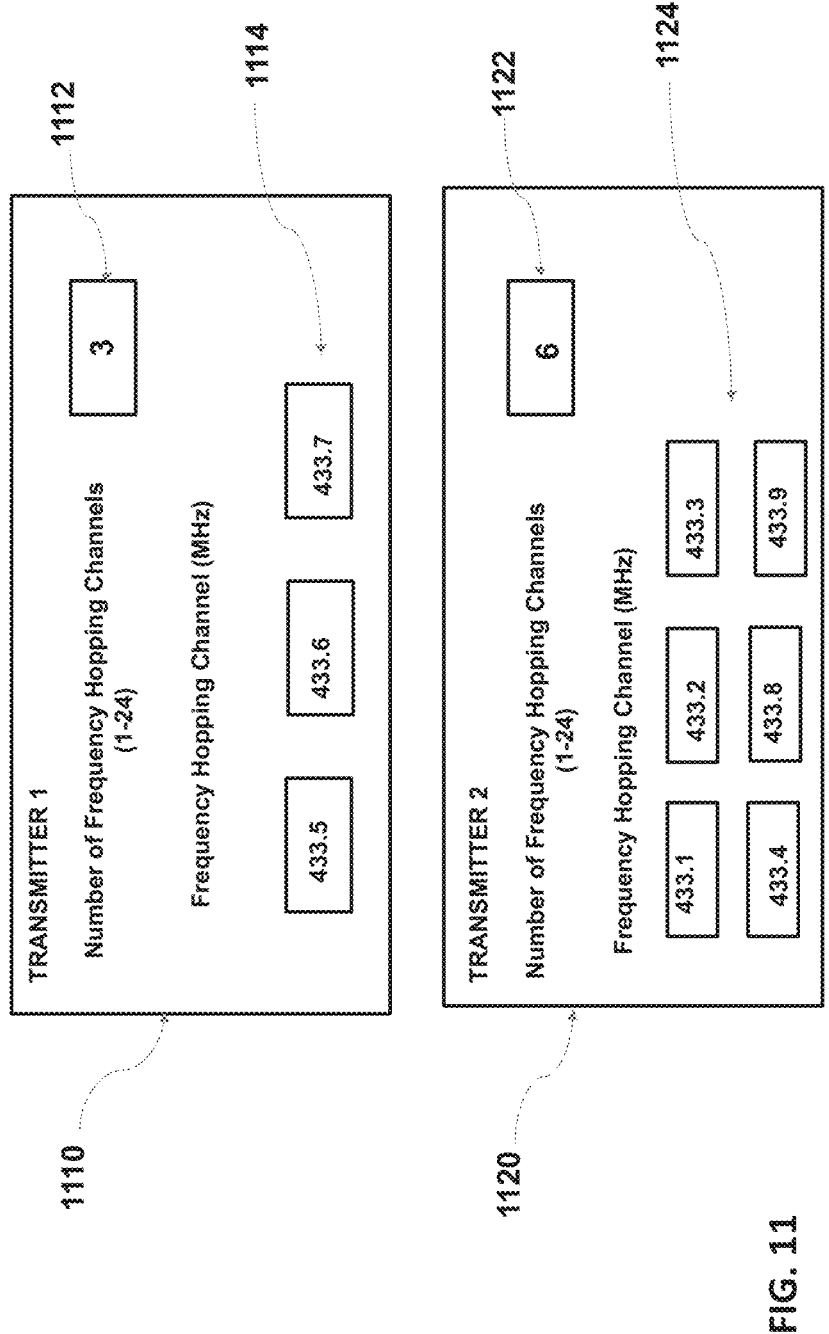
FIG. 11 is a conceptual diagram for explaining a method of programming transmitters for adding frequency hopping channels according to some embodiments.

FIG. 11 is a conceptual diagram for explaining a method of programming or controlling transmitters for adding sub-frequency channels based on the concept of frequency hopping according to some embodiments. As described above, the transmitters 606, 606a, and 606b of the ground-based module 212 can be operated with particular frequencies (e.g., 433 MHz, 915 MHz, etc.) that are different from each other. At least one of the transmitters 606, 606a, and 606b can be programmed to add one or more sub-frequency channels or frequency hopping channels, for example, using frequency hopping. The transmitter programming can be performed by the MCU 604 or another computing device that is in data communication with the MCU 604 or the transmitters 606, 606a, and 606b. Similarly, at least one of the transmitters 626, 626a, and 626b of the remote-mounted module 222 can also be programmed to add one or more sub-frequency channels or frequency hopping channels, for example, using frequency hopping.

When the transmitter programming is performed by the computing device, the computing device can communicate data with the MCU 604 and display a first user interface 1110 to program transmitter 1, for example, the transmitter 606a (see FIG. 10). The first user interface 1110 can include a region 1112 for designating the number of frequency hopping channels and a region 1114 showing example frequency hopping channels that have been added. The first user interface 1110 shows that the number of frequency hopping channels is 3 and the added frequency hopping channels. For example, the example frequency hopping channels, which have been added to the base frequency of 433 MHz, can include 433.5 MHz, 433.6 MHz, and 433.7 MHz. In these embodiments, the transmitter 606a transmits the command packet (PPM frames) using the base frequency of 433 MHz, and the added frequencies of 433.5 MHz, 433.6 MHz, and 433.7 MHz, as long as these added frequencies do not overlap frequencies used in another transmitter in the ground-based module 212. The additional frequency channels can further enhance the security from unauthorized tampering attempts.

The computing device can display a second user interface 1120 to program transmitter 2. The second user interface 1120 can also include a region 1122 for designating the number of frequency hopping channels for the base frequency of 433 MHz and a region 1124 showing example frequency hopping channels. The second user interface 1120 shows that the number of frequency hopping channels is 6 and the added frequency hopping channels are 433.1 MHz, 433.2 MHz, 433.3 MHz, 433.4 MHz, 433.8 MHz, and 433.9 MHz that do not overlap with any of 433 MHz, 433.5 MHz, 433.6 MHz, and 433.7 MHz of the frequency hopping channels in the transmitter 1. The configuration of the user interfaces 1110 and 1120 shown in FIG. 11 are merely examples and the present disclosure is not limited thereto. Furthermore, the numbers of frequency hopping channels are merely examples, and the present disclosure is not limited thereto. For example, the number of frequency hopping channels can be up to 24 or more. Other frequencies surrounding another base frequency such as 915 MHz can also be used.

Figure 12:
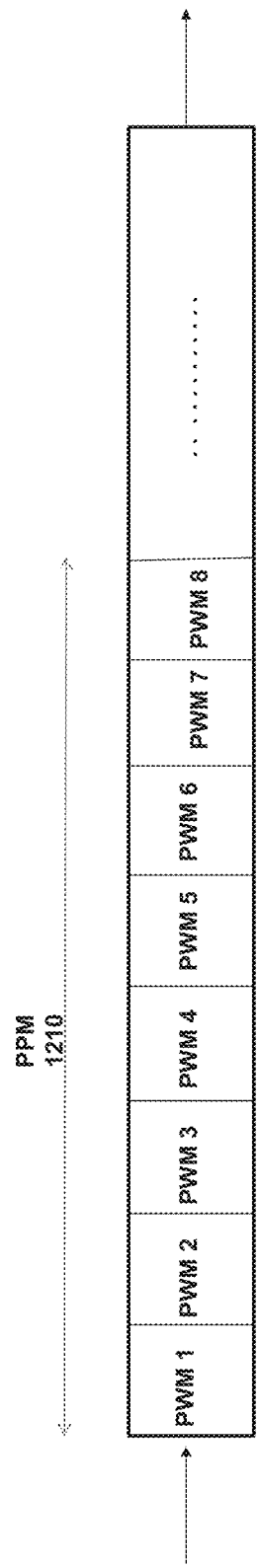
FIG. 12 is an example PPM data frame to be used for communicating between the ground-based communication module and the remote-mounted communication module according to some embodiments.

FIG. 12 is an example PPM data frame 1210 to be used for communicating between the ground-based module 212 and the remote-mounted module 222 according to some embodiments. In some embodiments, the PPM frame 1210 may include a plurality of PWM frames or signals. One PWM frame may include a plurality of digital values (e.g., combination of 0 and 1). One PWM frame may be represented by 8 bits (0-255 values). However, this is merely an example, the present disclosure is not limited thereto.

One PPM frame may include 5-8 PWM frames. In these embodiments, a PPM data stream can include a plurality of PPM frames each including a plurality of PWM frames. The plurality of PWM frames can be used to control a plurality of actuators to respectively drive a plurality of components in the drone 220. The number of the PWM frames included in one PPM frame may correspond to the number of the components of the drone 220 to be controlled. For example, if the drone 220 includes only five motors to be controlled, the one PPM frame may include five PWMs. As another example, if the drone 220 includes eight components to be controlled, the one PPM frame may include eight PWMs. However, the present disclosure is not limited thereto. One PPM frame may include less than five or more than 8 PWM frames depending on the embodiment.

FIG. 13 is an example drone system 220 including various components to be controlled by received PPM data frames each including multiple PWM signals according to some embodiments. As disclosed herein, a PPM signal may be interchangeably used with a PPM frame (or a PPM data frame). Similarly, a PWM signal may be interchangeably used with a PWM frame (or a PWM data frame). Referring to FIG. 13, the MCU 622 may include a PPM to PWM converter 224 that can convert an incoming PPM data frame 1310 into multiple PWM signals (e.g., PWM 1-PWM 8), and control various components based on the converted PWM signals. For example, the components include, but are not limited to, motors 225 and 226, a servo 227, a navigation light 228, a flight control mode 229, and a payload control mode 231. Only six PWMs are shown in FIG. 13, but the present disclosure is not limited thereto. The flight control mode 229 may include, for example, an operation for deploying a landing gear or retracting the landing gear. The payload control mode 231 may include, for example, operations for turning on and off a camera.

Figure 14:
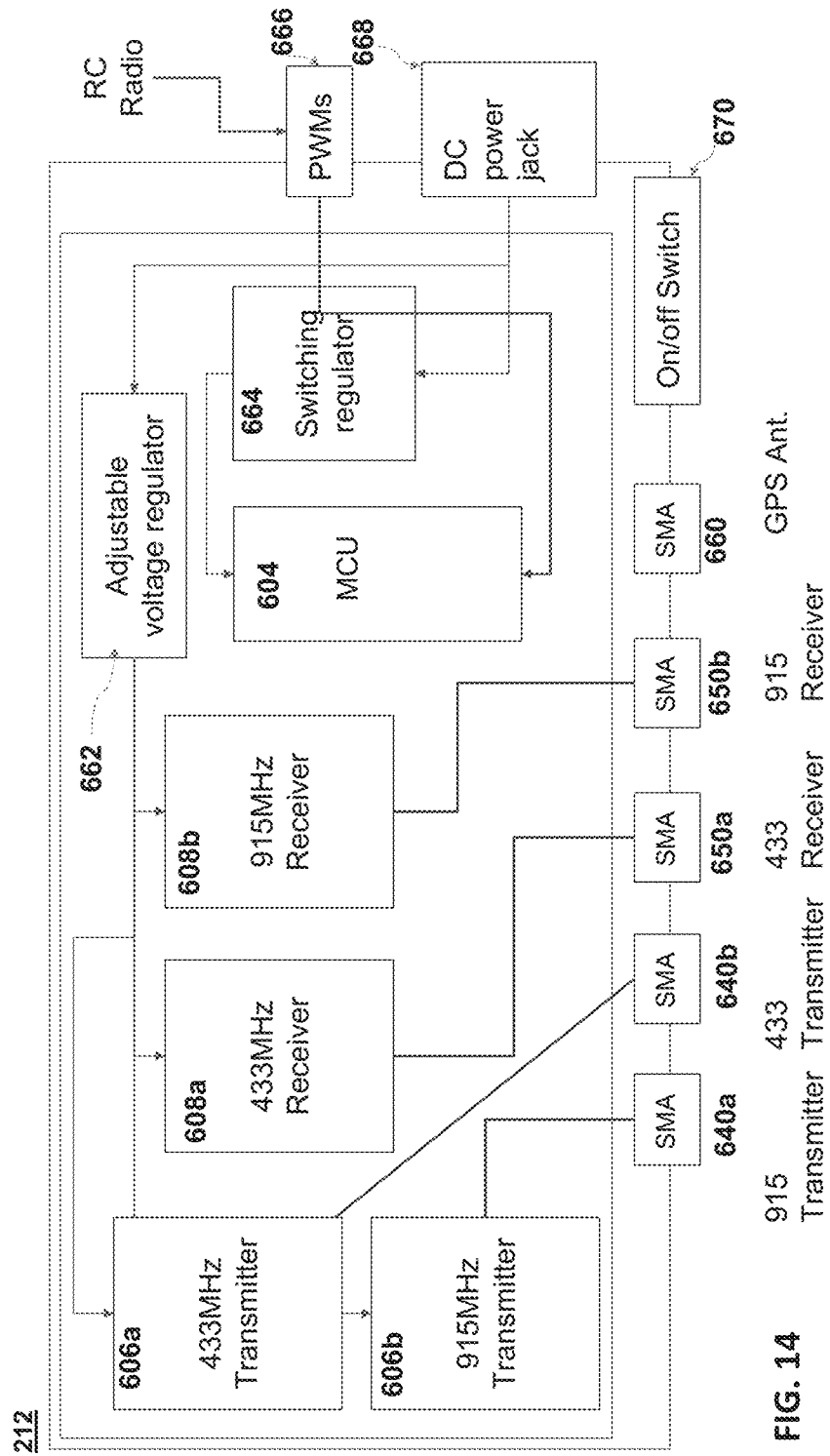
FIG. 14 is an example block diagram of the ground-based communication module according to some embodiments.

FIG. 14 is an example block diagram of the ground-based communication module 212 according to some embodiments. The ground-based module 212 shown in FIG. 14 is merely an example ground-based module, and certain elements may be modified or removed, and/or other elements or equipment may be added.

The ground-based module 212 may include at least two transmitters 606a and 606b, and at least two receivers 608a and 608b. The transmitter 606a and the receiver 608a can be configured to operate in a frequency of 433 MHz. The transmitter 606b and the receiver 608b can be configured to operate in a frequency of 915 MHz. Again, these frequencies are merely examples and other frequencies can also be used. The transmitters 606a/606b and the receivers 608a/608b can be respectively connected to antennas via the antenna interfaces 640a, 640b, 650a, and 605b (such as SMA).

The ground-based module 212 can also include an antenna interface 660 for a GPS antenna. As described above, the MCU 604 can receive and process a plurality of PWM signals 666 from the remote controller 210. The ground-based module 212 may also include a power board. The power board may include, but is not limited to, an adjustable voltage regulator 662 and a switching regulator 664 both of which are electrically connected to a DC power jack 668. The adjustable voltage regulator 662 can be operated with, for example, a 8 volt power, but the present disclosure is not limited thereto. The switching regulator 664 can be operated with, for example, a 5 volt power, but the present disclosure is not limited thereto. The ground-based module 212 may also include an on/off switch 670 configured to turn on or off the power of the ground-based module 212.

Figure 15:
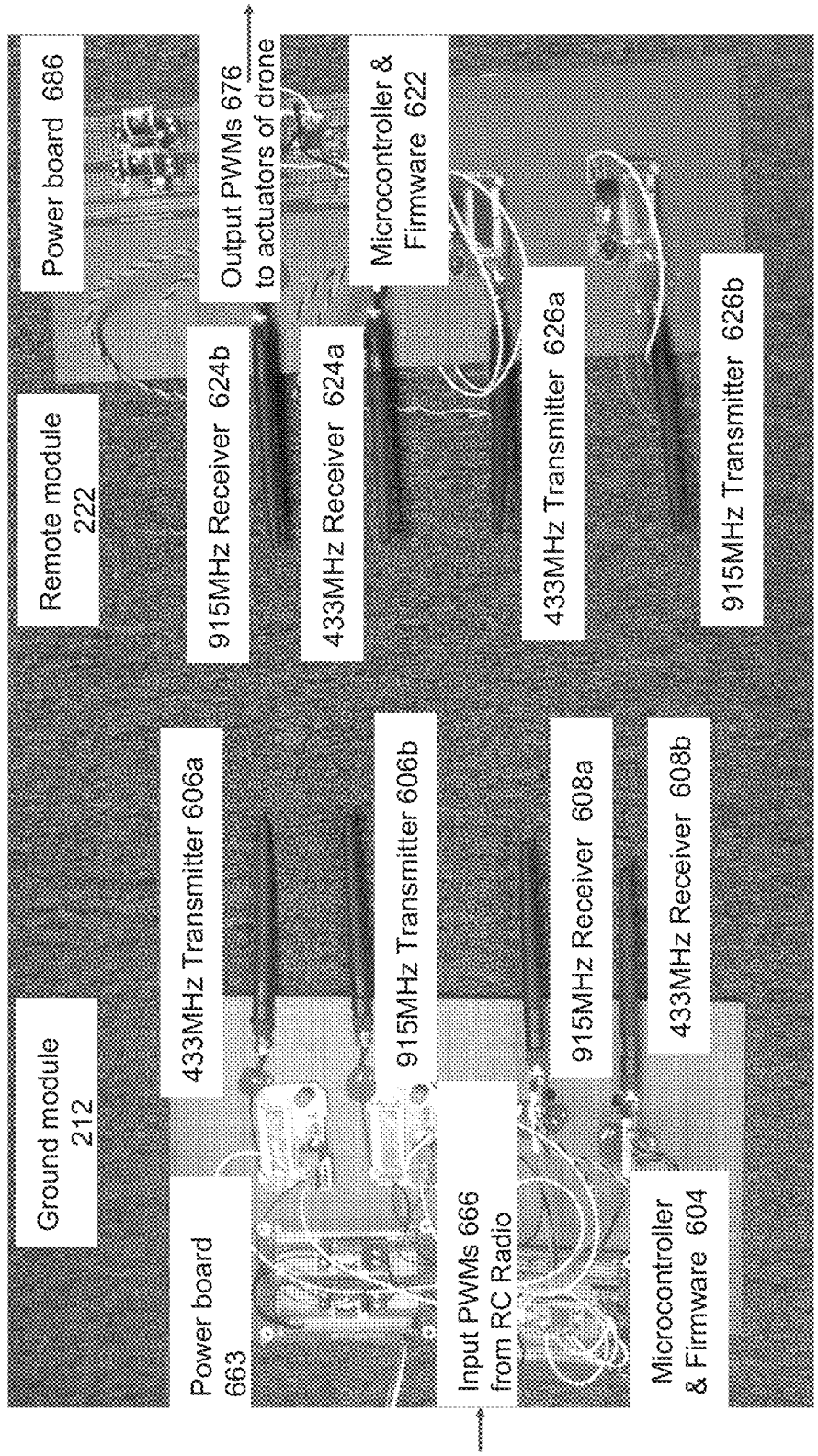
FIG. 15 illustrates example circuit layouts of the ground-based communication module and the remote-mounted communication module according to some embodiments.

FIG. 15 illustrates example circuit layouts of the ground-based communication module 212 and the remote-mounted communication module 222 according to some embodiments. The circuit layouts shown in FIG. 15 are merely example layouts, and certain circuit elements may be modified or removed, and/or other elements or equipment may be added.

The ground-based module 212 may include a power board 663, a 433 MHz transmitter 606a, a 915 MHz transmitter 606b, a 915 MHz receiver 608a, a 433 MHz receiver 608b, and a microcontroller & firmware (MCU) 604. The power board 663 may include, but is not limited to, the adjustable voltage regulator 662 and the switching regulator 664 shown in FIG. 14. As described above, the MCU 604 can receive the PWM frames 666 from the remote controller 210 and process the received PWM frames 666. Although the transmitter/receiver pairs 606a/608b, and 606b/608a are respectively operated in frequencies of 433 MHz and 915 MHz, but the present disclosure is not limited thereto. Other frequencies (e.g., other MHz range or GHz range) or added frequencies by frequency hopping can also be used.

The remote-mounted module 222 may include a 433 MHZ transmitter 626a, a 915 MHz transmitter 626b, a 915 MHz receiver 624b, a 433 MHZ receiver 624a, a microcontroller & firmware (MCU) 622, and a power board 686. As described above, the MCU 622 can convert each of received PPM frames into a plurality of PWM frames and send the converted PWM frames 676 to components or actuators of the drone 220. Similarly, although the transmitter/receiver pairs 626a/624a, and 626b/624b are respectively operated in frequencies of 433 MHz and 915 MHz, but the present disclosure is not limited thereto. Other frequencies (e.g., other MHz range or GHz range) or added frequencies by frequency hopping can also be used.

Figure 16:
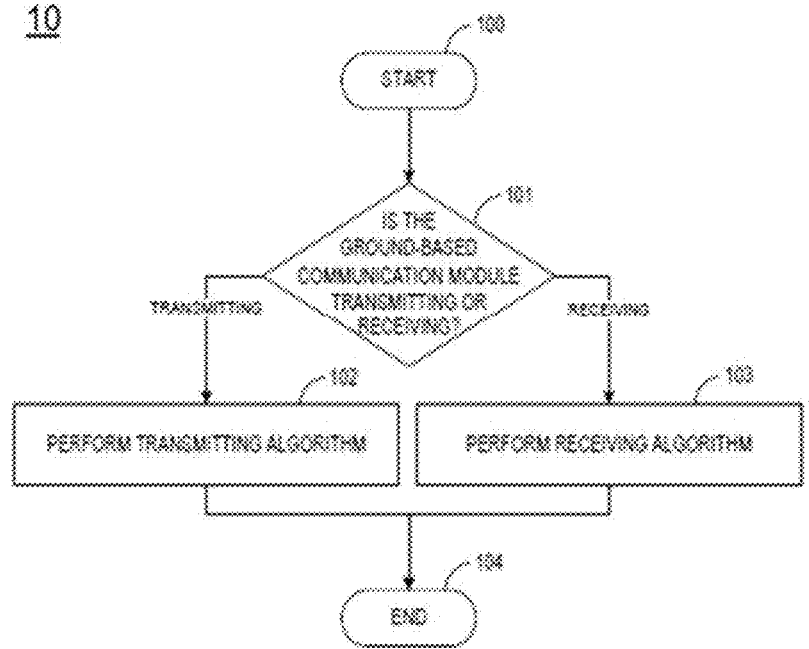
FIG. 16 is an example flow process diagram for performing a transmitting process and a receiving process in the ground-based communication module according to some embodiments.

FIG. 16 is an example flow process diagram 10 for performing a transmitting process and a receiving process in the ground-based communication module 212 according to some embodiments. FIG. 16 is merely an example process, and certain states elements may be removed, other states added, two or more states combined or one state can be separated into multiple states depending on the specification and requirements. FIG. 16 shows a software algorithm or a process executing on the ground-based communication module 212 reading command packets from the remote controller 210. The software algorithm can perform different operations based on whether the algorithm is for transmitting or receiving. The remote-mounted module 222 can also perform substantially similar transmitting and receiving processes.

Referring to FIG. 16, the flow process diagram 10 starts at state 100. In state 101, it is determined whether the ground-based communication module 212 is instructed or controlled to perform the transmitting process or the receiving process. If it is determined in state 101 that the ground-based module 212 is instructed or controlled to perform the transmitting process, the transmitting algorithm (or transmitting process) is performed (state 102). For example, the MCU 604 of the ground-based module 212 can perform the transmitting algorithm by controlling one or more of the transmitters 606 (see, e.g., FIG. 9).

If it is determined in state 101 that the ground-based module 212 is instructed or controlled to perform the receiving process, the receiving algorithm (or receiving process) is performed (state 103). For Example, the MCU 604 of the ground-based module 212 can perform the receiving algorithm by controlling one or more of the receivers 608 (see, e.g., FIG. 9). Once the transmitting algorithm or the receive algorithm is performed, the flow process diagram 10 ends at state 104.

The flow process diagram 10 can be performed by one or more processors such as the MCU 604 in FIG. 9 and FIG. 10. At least one of the transmitting algorithm or the receive algorithm can also be performed by one or more processors such as the MCU 604 in FIG. 9 and FIG. 10. If the flow process diagram 10 is performed in the remote-mounted module 222, at least one of the transmitting algorithm or the receive algorithm can be performed by one or more processors such as the MCU 622 in FIG. 9 and FIG. 10. However, the present disclosure is not limited thereto, and the flow process diagram 10 can be performed by another computing device (wirelessly or wiredly) coupled to the MCU 604 or the MCU 622.

Figure 17:
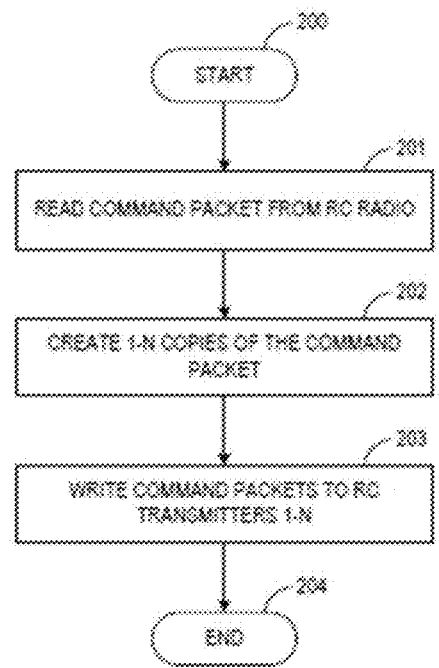
FIG. 17 is an example flow process diagram to be performed in the ground-based communication module in the tamper-resistant datalink communications system according to some embodiments.

FIG. 17 is an example flow process diagram 20 to be performed by the ground-based module 212 according to some embodiments. FIG. 17 is merely an example process flow diagram, and certain states elements may be removed, other states added, two or more states combined or one state can be separated into multiple states depending on the specification and requirements. The flow process diagram 20 can be performed by one or more processors such as the MCU 604. However, the present disclosure is not limited thereto, and the flow process diagram 20 can be performed by another computing device (wirelessly or wiredly) coupled to the MCU 604. For the purpose of convenience, the description will be made based on the MCU 604 performs the flow process diagram 20.

Referring to FIG. 17, the flow process diagram 20 starts at state 200. In state 201, the MCU 604 may read a command packet (e.g., PWMs 666 in FIG. 10) received from the remote controller 210. In state 202, the MCU 604 may create 1-N copies of the command packet. The MCU 604 may convert the plurality of PWM frames into a single PPM frame, and duplicate N copies of the PPM frame. For example, referring to FIG. 18, the MCU may duplicate PPM frames (PPM 1, PPM 2, PPM 3, . . . ) each including, for example, 8 PWM frames. This can be referred as the RAID 1 mirroring concept (to be described below). As described above, the number of PWM frames included in one PPM frame may depend on a predetermined communication standard or the number of components to be controlled in the drone 220. So, depending on the embodiment, each PPM frame can include at least two PWM frames, or less than or more than 8 PWM frames.

Figure 18:
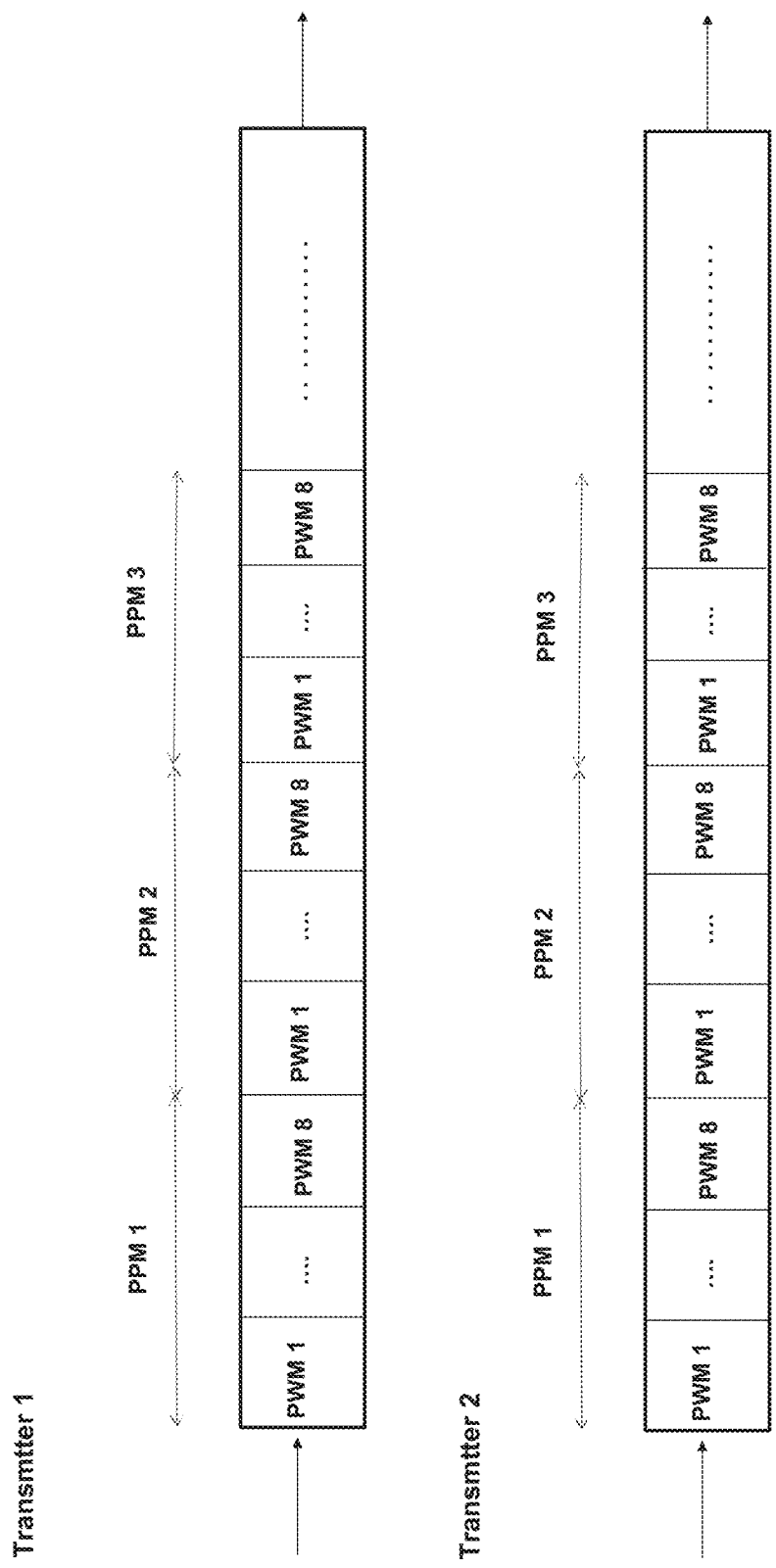
FIG. 18 is an example sequence of PPM data frames to be sent to the remote-mounted communication module according to some embodiments.

In state 203, the MCU 604 can write command packets to two or more transmitters 606. If there are N number of PPM frames to control N drone components, N number of transmitters on the ground-based module 212 can be used. For the purpose of convenience, FIG. 18 shows only two transmitters (transmitters 1 and 2) each transmitting the same sequence of PPM frames.

Figure 19:
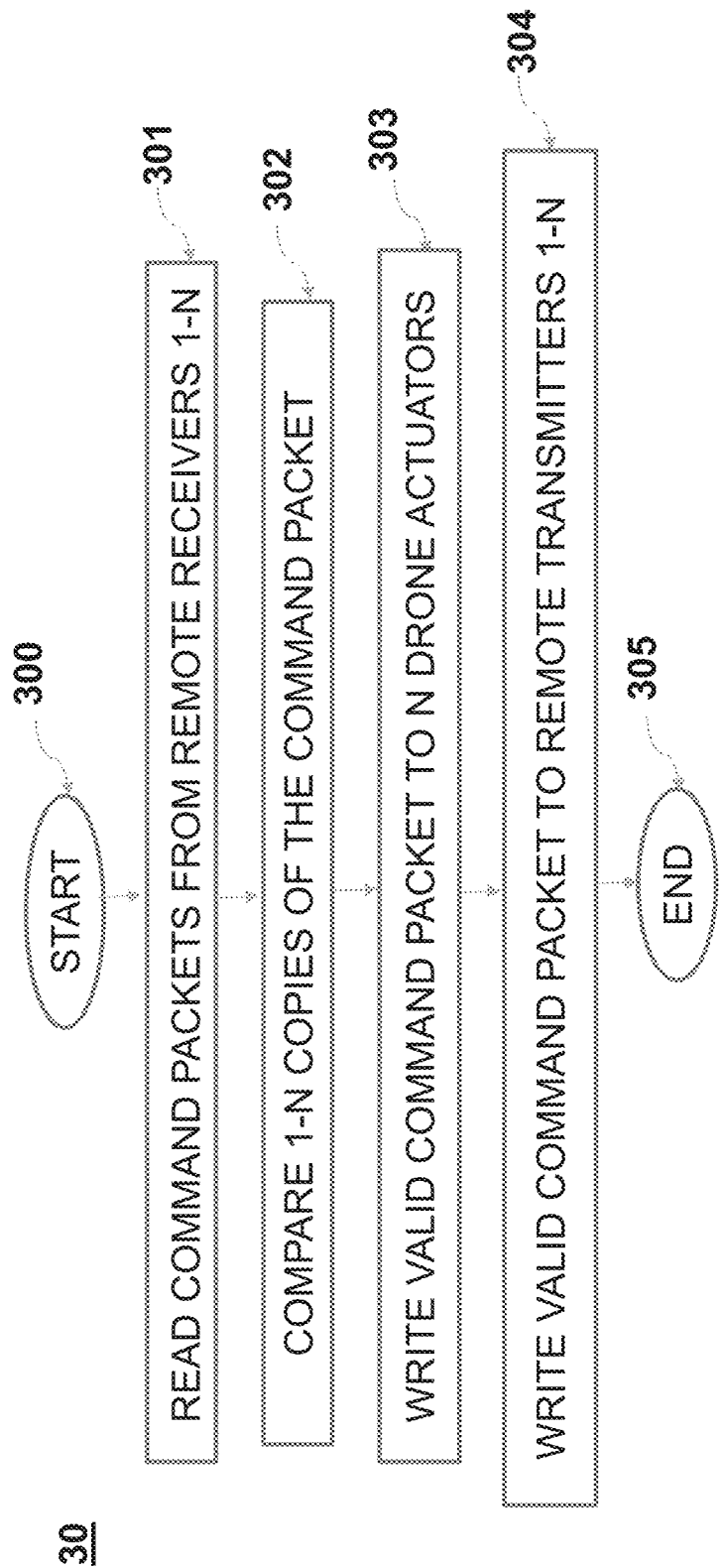
FIG. 19 is an example flow process diagram to be performed in the remote-mounted communication module according to some embodiments.

FIG. 19 is an example flow process diagram 30 to be performed in the remote-mounted communication module 222 according to some embodiments. FIG. 19 is merely an example process flow diagram, and certain states elements may be removed, other states added, two or more states combined or one state can be separated into multiple states depending on the specification and requirements. The flow process diagram 30 can be performed by one or more processors such as the MCU 622. However, the present disclosure is not limited thereto, and the flow process diagram 30 can be performed by another computing device (wirelessly or wiredly) coupled to the MCU 622. For the purpose of convenience, the description will be made based on the MCU 622 performs the flow process diagram 30.

Referring to FIG. 19, the flow process diagram 30 starts at state 300. In state 301, the MCU 622 of the remote-mounted module 222 may read command packets (1-N) received from the receivers 624 of the remote-mounted module 222. For example, the MCU 622 may receive a sequence of PPM frames shown in FIG. 18.

In state 302, the MCU 622 may compare 1-N copies of the command packet. For example, as shown in FIG. 20, the MCU 622 may compare a sequence of the PPM frames received by receiver 1 and a sequence of the PPM frames (e.g., PPM 1) received by receiver 2. Although FIG. 20 shows only one PPM frame, the comparison can be done on the sequence of the PPM data frames transmitted from the ground-based module 212 (see, for example, FIG. 18). The MCU 622 may determine a valid command packet if the comparison shows that the two PPM data frames are the same (see Receivers 1 and 2 in FIG. 20). The MCU 622 may also determine a non-valid command packet if the comparison shows that the two PPM data frames are not the same (tampered, interfered or otherwise modified during the transmission) (see Receivers 2 and 3 in FIG. 20).

In state 303, the MCU 622 may write the valid command packet to N numbers of drone components or actuators, for example, as shown in FIG. 13. The valid command packet containing multiple PWM frames can be used to control actuators that are configured to drive the corresponding components of the drone 220.

In state 304, the MCU 622 may also write the valid command packet (1-N) to the transmitters 626 of the remote-mounted module 222 so that the valid command packet can also be sent to the ground-based module 212 to acknowledge or confirm that the valid command packet has been successfully received and retrieved by the remote-mounted module 222. If the ground-based module 212 does not receive the valid command packet for a predetermined of time, the MCU 604 of the ground-based module 212 may provide a transmission error signal so that the remote control operator can be aware of the transmission error. The state 304 may be optional and thus can be omitted. In state 305, the flow process diagram 30 ends.

Figure 21:
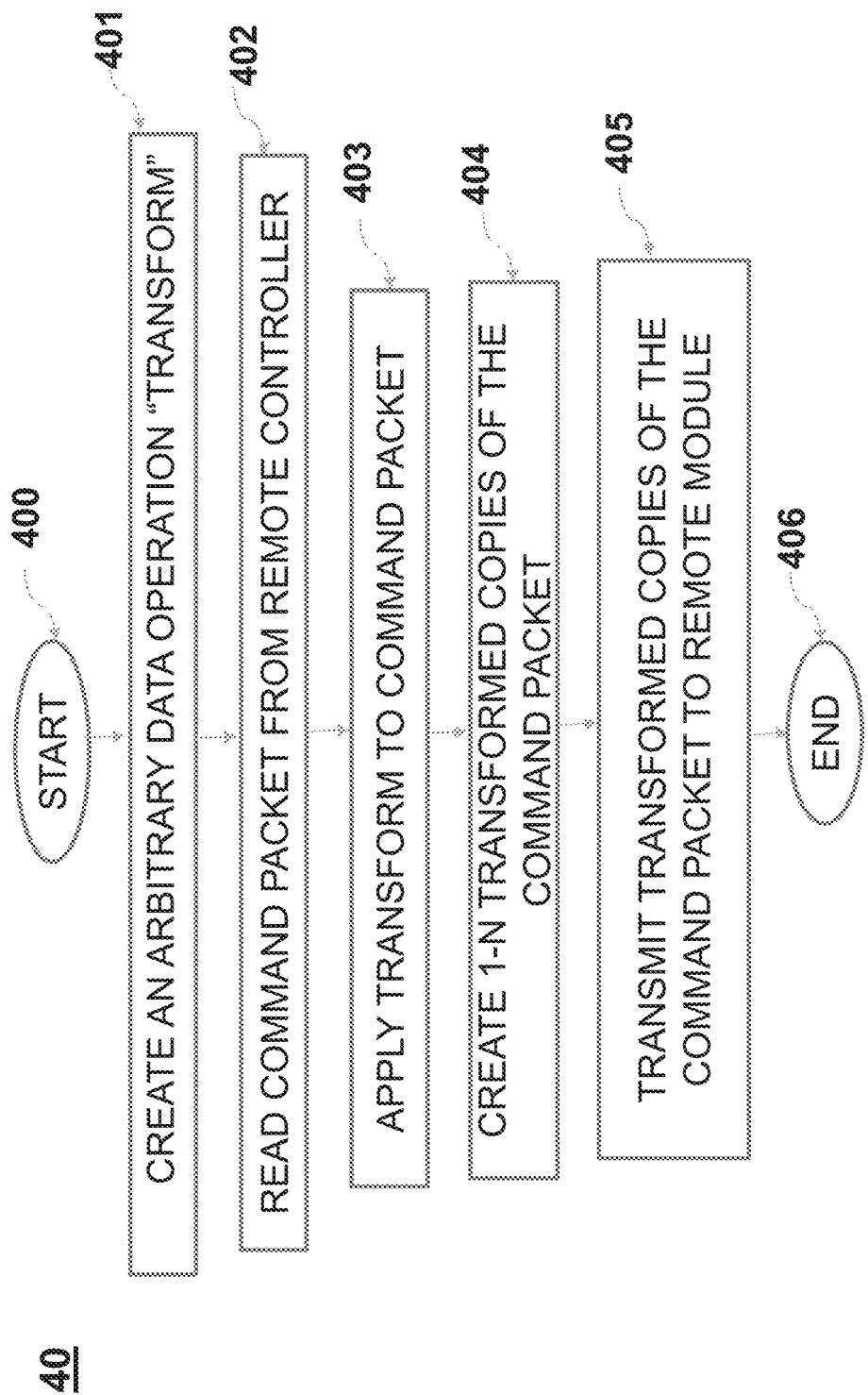
FIG. 21 is another example flow process diagram to be performed in the ground-based communication module according to some embodiments.

FIG. 21 is another example flow process diagram 40 to be performed in the ground-based module 212 according to some embodiments. FIG. 21 is merely an example process flow diagram, and certain states elements may be removed, other states added, two or more states combined or one state can be separated into multiple states depending on the specification and requirements. The flow process diagram 40 can be performed by one or more processors such as the MCU 604. However, the present disclosure is not limited thereto, and the flow process diagram 40 can be performed by another computing device (wirelessly or wiredly) coupled to the MCU 604. For the purpose of convenience, the description will be made based on the MCU 604 performs the flow process diagram 40.

Referring to FIG. 21, the flow process diagram 40 starts at state 400. In state 401, the MCU 604 may create an arbitrary data operation "transform". In some embodiments, the MCU 604 may store a predetermined transformation rule or algorithm and create an arbitrary data operation "transform" based on the transformation rule or algorithm.

One example of the transformation rule may be using the RAID concept. For example, RAID 0 is a data stripping concept as shown in FIG. 22. RAID 1 is a data mirroring concept as described above with respect to FIG. 18. The RAID 0 concept can send more data (e.g., double) than the RAID 1 concept, however, the RAID 0 concept can sacrifice or compromise data protection in case of data interference/tampering/modification. In contrast, the RAID 1 concept can send less data (e.g., half) than the RAID 0 concept, however, the RAID 1 concept can protect from data interference/tampering/modification, as two or more duplicate copies are sent. RAID 1+0 combines the concepts of RAID 1 and RAID 0. For example, transmitter 1 can transmit PWM 1, PWM 2, PWM 3, PWM 4, PWM 1, PWM 2, PWM 3, PWM 4, whereas transmitter 2 can transmit PWM 5, PWM 6, PWM 7, PWM 8, PWM 5, PWM 6, PWM 7, PWM 8. RAID 3 concept combines data stripping and dedicated parity transmission as shown in FIG. 23A where one transmitter transmits only parity codes. RAID 5 concept combines data stripping and non-dedicated parity transmission as shown in FIG. 23B whereas the parity code is distributed among multiple transmitters.

However, the present disclosure is not limited thereto, and other rules or algorithms can also be used. In other embodiments, the MCU 604 may not store a predetermined transformation rule or algorithm, and create an arbitrary data operation "transform" based on a predetermined drone communication standard.

In state 402, the MCU 604 may read a command packet (e.g., PWM frames 666 in FIG. 10) received from the remote controller 210. In state 403, the MCU 604 may apply a transform rule or algorithm to the command packet. In some embodiments, the MCU 604 may create a PPM frame including 8 PWM frames to be sent by one transmitter as shown in FIG. 22. For example, when there are 16 PWM frames, the MCU 604 may control transmitter 1 to transmit PWM 1, PWM 3, PWM 5, PWM 7, PWM 9, PWM 11, PWM 13, and PWM 15. The MCU 604 may also control transmitter 2 to transmit PWM 2, PWM 4, PWM 6, PWM 8, PWM 10, PWM 12, PWM 14, and PWM 16. In these embodiments, the MCU 604 may not generate duplicate PPM frames.

In other embodiments, the MCU 604 may also include an error detection data frame (e.g., parity code) in one or more transmitters. For example, as shown in FIG. 23A, the MCU 604 may include an error detection data frame (e.g., parity code) in transmitter 3 while controlling transmitters 1 and 2 each to transmit 8 PWM frames (one PPM) as described with respect to FIG. 22. In FIG. 23A, parity code [1, 2] means a parity code between PWM 1 and PWM 2, parity code [3, 4] means a parity code between PWM 3 and PWM 4, parity code [5, 6] means a parity code between PWM 5 and PWM 6, parity code [7, 8] means a parity code between PWM 7 and PWM 8. Similarly, parity code [9, 10] means a parity code between PWM 9 and PWM 10, parity code [11, 12] means a parity code between PWM 11 and PWM 12, parity code [13, 14] means a parity code between PWM 13 and PWM 14, parity code [15, 16] means a parity code between PWM 15 and PWM 16, These parity codes can be used to detect whether one of the pair PWM signals (1/2, 3/4, 5/6, 7/8, 9/10, 11/12, 13/14, 15/16) are tampered, interfered, or otherwise modified. The parity code may also be used to at least partially recover one or both of the pair PWM signals when they are tampered, interfered, or otherwise modified.

In other embodiments, as shown in FIG. 23B, at least some of the parity code frames can be included among all of the available transmitters. For example, transmitter 1 includes two parity codes ([5, 6] and [11, 12]), transmitter 2 includes two parity codes ([3, 4] and [13, 14]), and transmitter 3 includes four parity codes ([1, 2], [7, 8], [9, 10] and [15, 16]). These are merely example parity code distribution, and the present disclosure is not limited thereto. For example, one of the transmitters 1-3 can include 5 or 6 parity codes, and the remaining two transmitters each can include one or two parity codes.

In state 404, the MCU 604 may create 1-N transformed copies of the command packet. In state 405, the MCU 604 may also transmit transformed copies of the command packet to the remote-mounted module 222. In state 406, the flow process diagram 40 ends.

Figure 24:
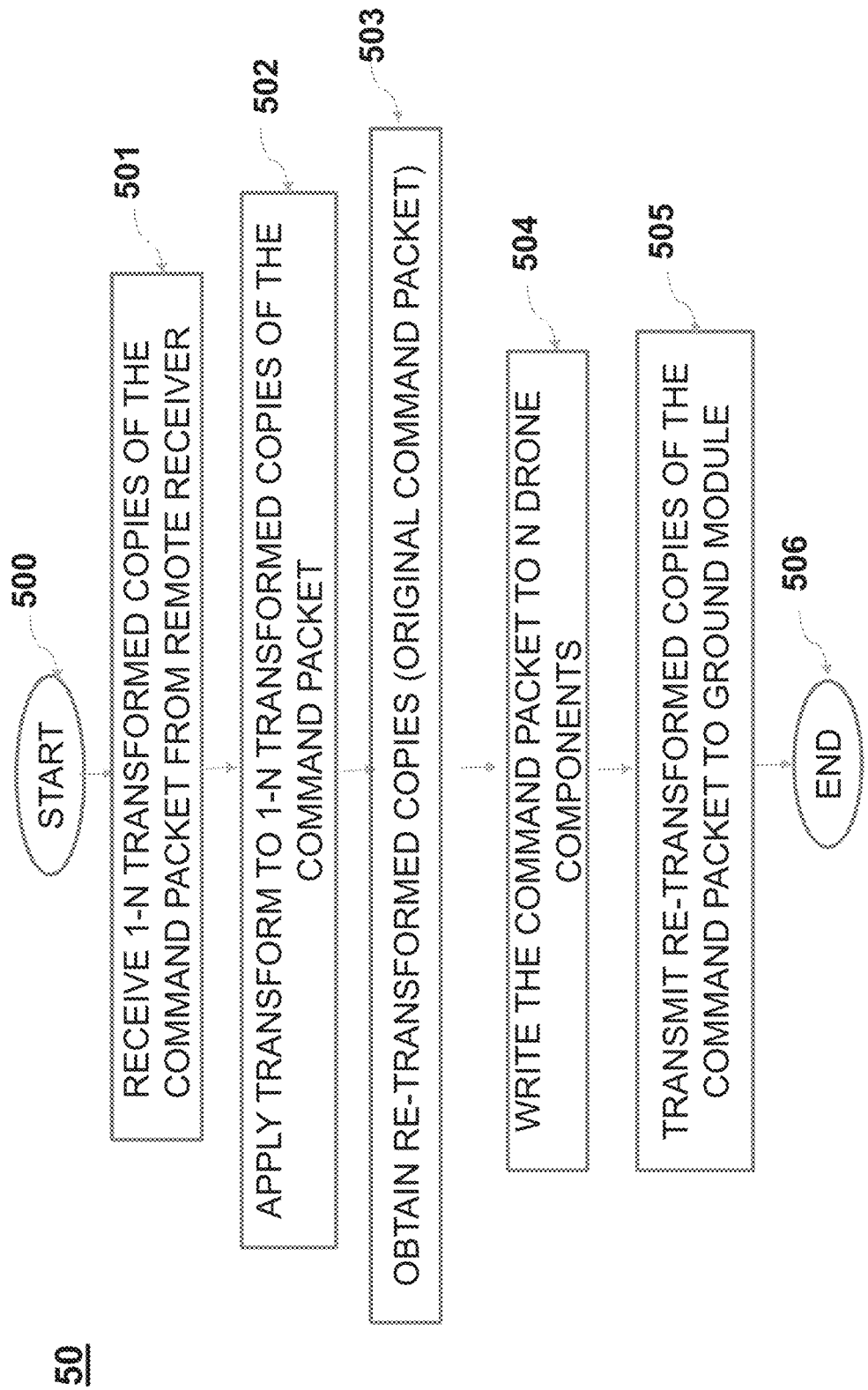
FIG. 24 is another example flow process diagram to be performed in the remote-mounted communication module according to some embodiments.

FIG. 24 is an example flow process diagram 50 to be performed by the remote-mounted module 222 according to some embodiments. FIG. 24 is merely an example process flow diagram, and certain states elements may be removed, other states added, two or more states combined or one state can be separated into multiple states depending on the specification and requirements. The flow process diagram 50 can be performed by one or more processors such as the MCU 622. However, the present disclosure is not limited thereto, and the flow process diagram 50 can be performed by another computing device (wirelessly or wiredly) coupled to the MCU 622. For the purpose of convenience, the description will be made based on the MCU 622 performs the flow process diagram 50.

Referring to FIG. 24, the flow process diagram 50 starts at state 500. In state 401, the MCU 622 may receive 1-N transformed copies of the command packet, e.g., as shown in one of FIGS. 22-23B, from the receiver 624 of the remote-mounted module 222 that received from the ground-based module 212. The 1-N transformed copies of the command packet may include, for example, multiple copies of the command packet as shown in one of FIG. 22, FIG. 23A and FIG. 23B.

In state 502, the MCU 622 may apply the transformation rule or algorithm to the received 1-N copies of the transformed command packet. In state 503, the MCU 22 may obtain the original command packet. For example, when the transformation rule or algorithm is to alternate PWM frames among transmitters (RAID 0) as shown in FIG. 22, the MCU 22 may re-transform (e.g., reverse the alternating rule) to the transmitters and restore the original command packet. Assuming 16 PWM frames are considered (see, for example, FIG. 22), receiver 1 of the remote-mounted module 222 would receive a sequence of PWM 1, PWM 3, PWM 5, PWM 7, PWM 9, PWM 11, PWM 13, and PWM 15 from the transmitter 1, and receiver 2 of the remote-mounted module 222 would receive a sequence of PWM 2, PWM 4, PWM 6, PWM 8, PWM 10, PWM 12, PWM 14, and PWM 16. By applying the transformation rule or algorithm (e.g., reversing the alternating rule), the MCU 622 can restore the original command packet data as shown in FIG. 25. In state 504, the MCU 622 may write the command packet to actuators of the drone 220 to drive the corresponding components. In state 505, the MCU 622 may transmit the re-transformed copies of the command packet to the ground-based module 212 to acknowledge or confirm that the valid command packet has been successfully received and retrieved by the remote-mounted module 222. In state 506, the flow process diagram 50 ends.

Figure 26A:
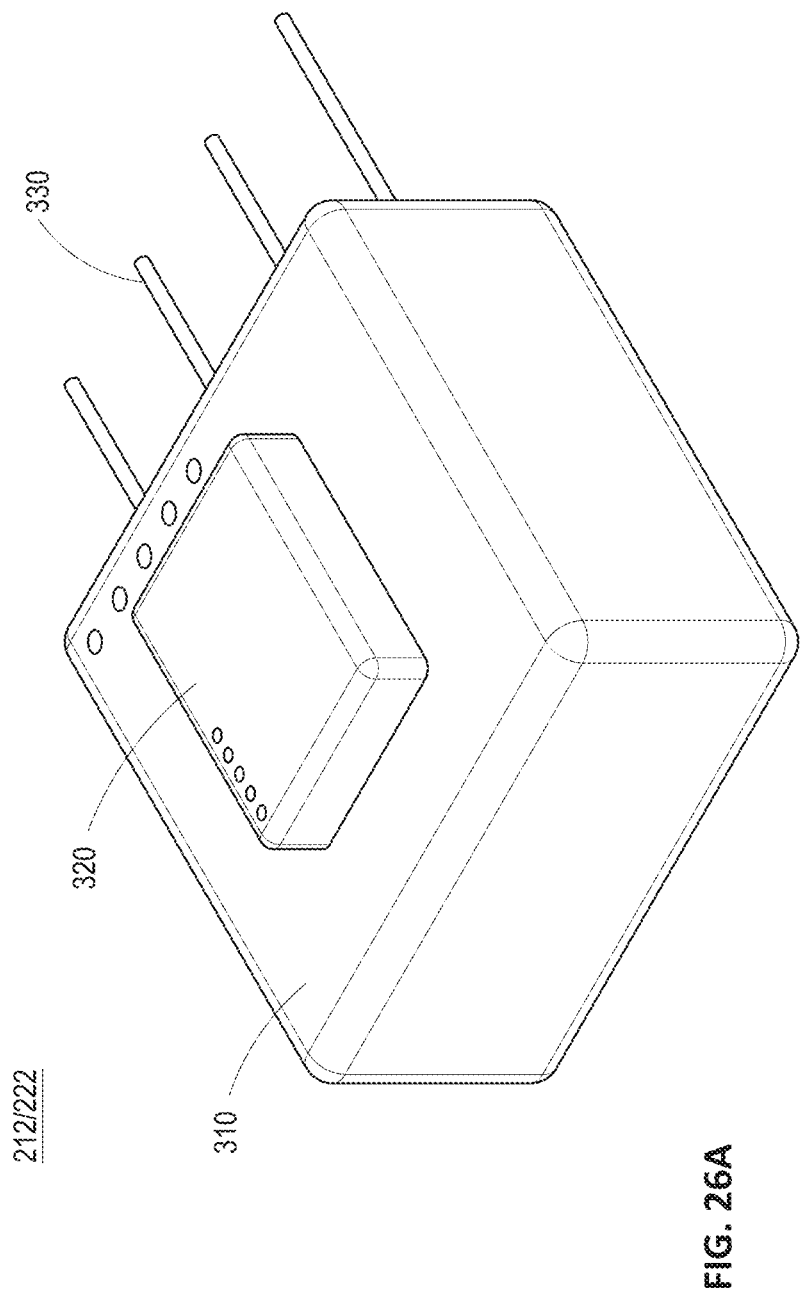
FIG. 26A-FIG. 26G show example exterior designs of the ground-based module or the remote-mounted module.
Figure 26B:
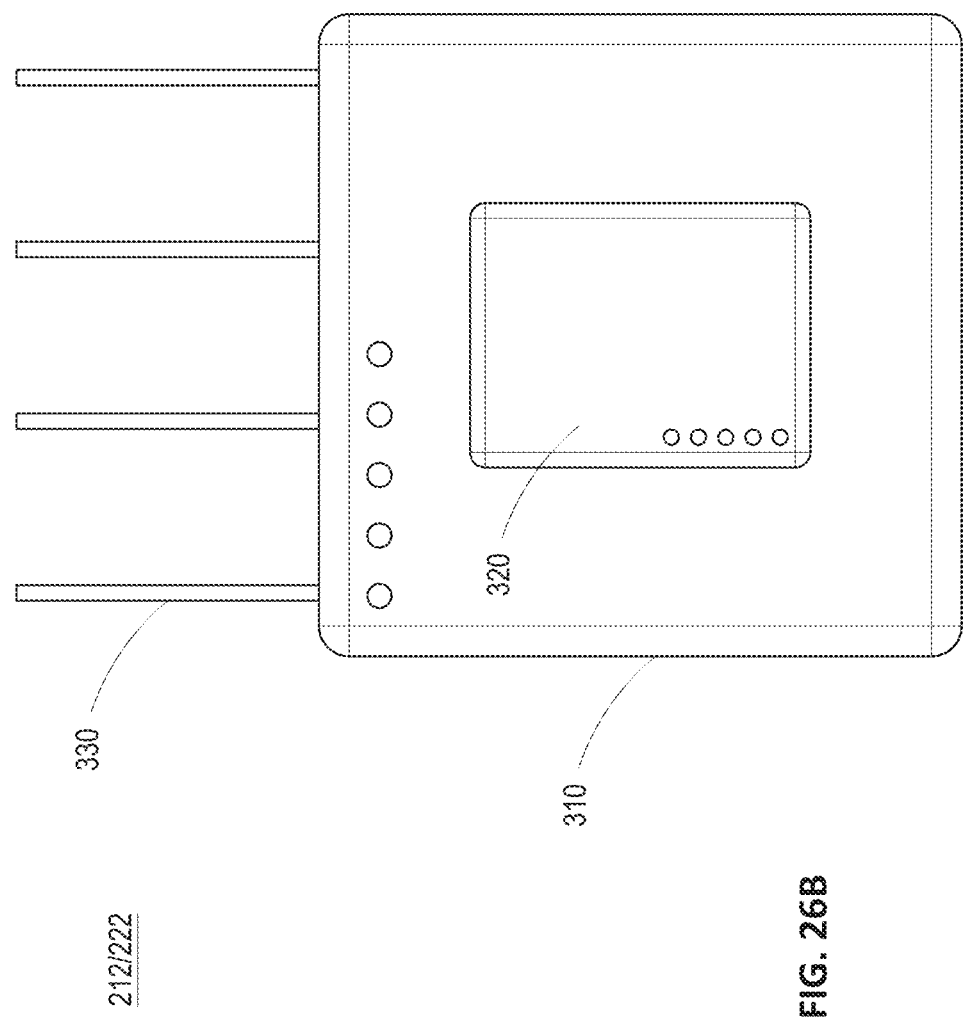
Figure 26C:
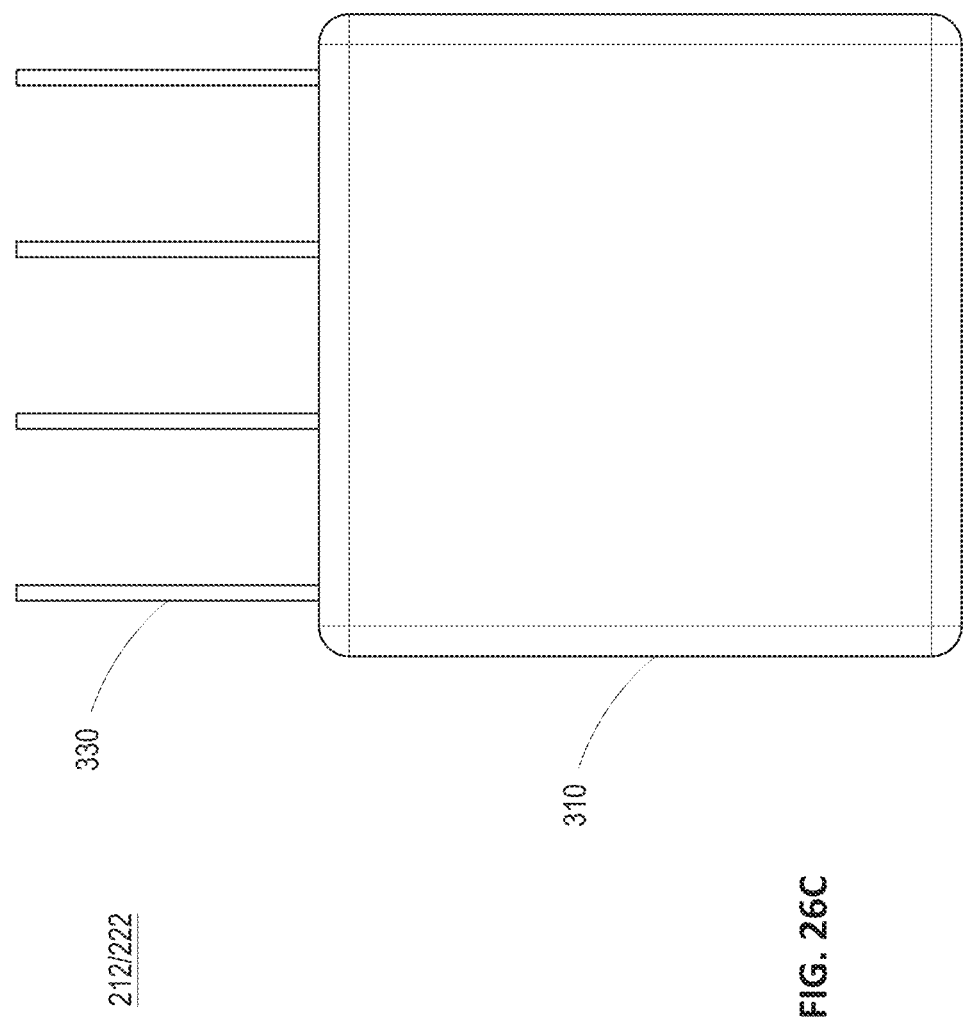
Figure 26D:
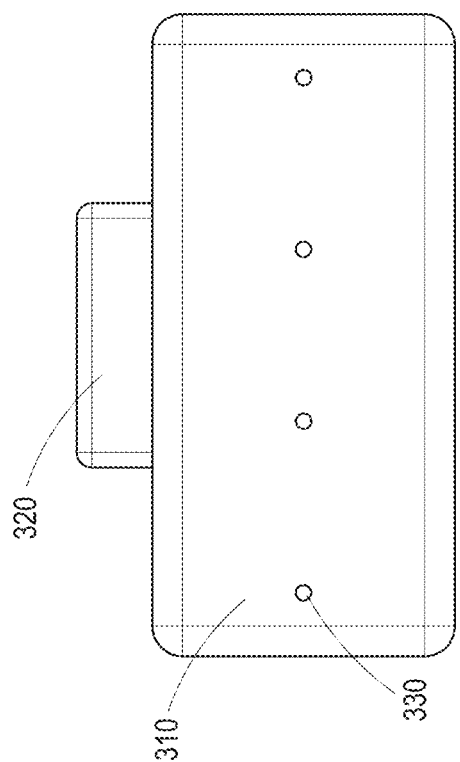
Figure 26E:
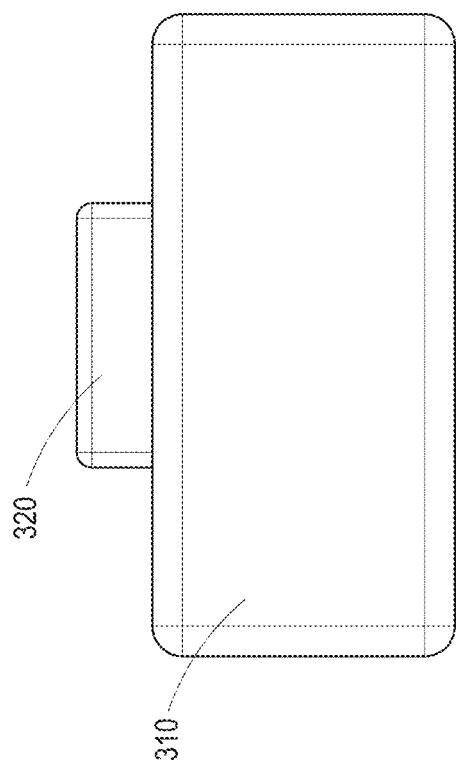
Figure 26F:
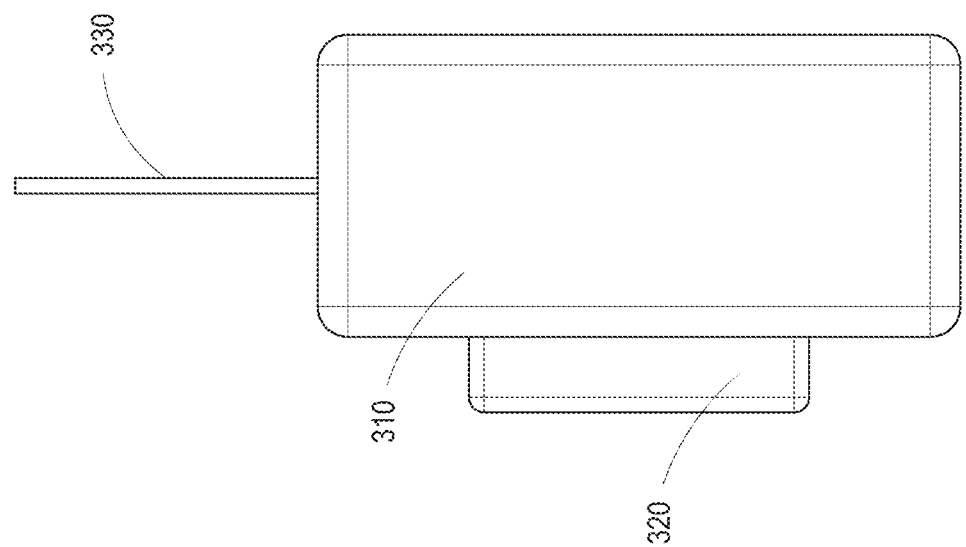
Figure 26G:
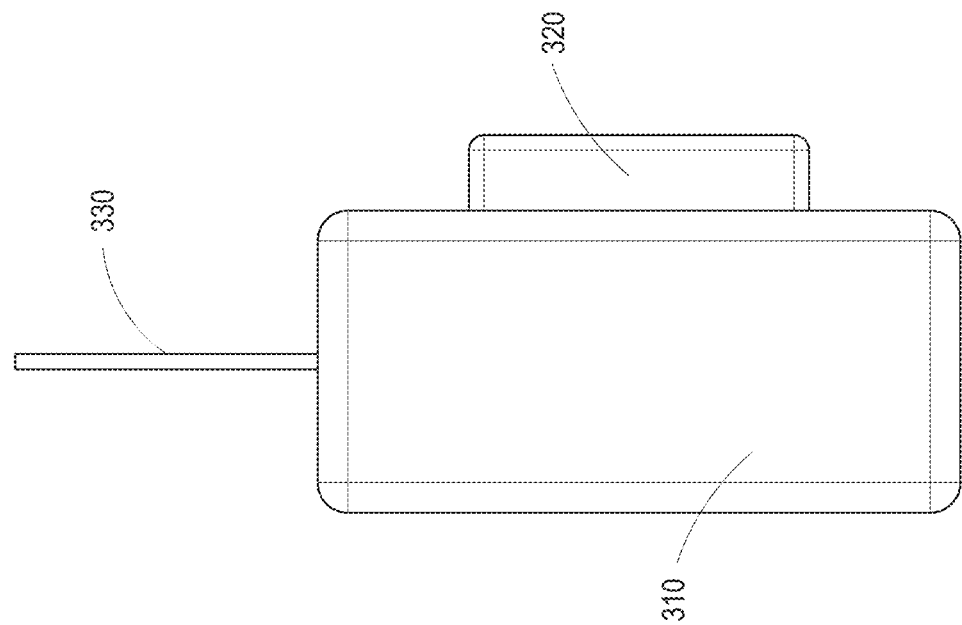

FIG. 26A-FIG. 26G show example exterior designs of the ground-based module 212 or the remote-mounted module 222. In some embodiments, FIG. 26A-FIG. 26G can be used for the ground-based module 212. In other embodiments, FIG. 26A-FIG. 26G can be used for the remote-mounted module 222. These exterior designs are merely examples, and the present disclosure is not limited thereto. FIG. 26A shows a perspective view of the ground-based module 212 or the remote-mounted module 222. FIG. 26B-FIG. 26G respectively show front, rear, top plan, bottom plan, left side and right side views of the ground-based module 212 or the remote-mounted module 222. In FIG. 26A-FIG. 26G, the ground-based module 212 or the remote-mounted module 222 may include a body 310, a protrusion 320, and one or more antennas 330. Although four antennas are shown in the figures, the present disclosure is not limited thereto. As described above, the protrusion 320 may be coupled to a designated area of the ground-based module 212 or the remote-mounted module 222. The dimensions shown in FIG. 26A-FIG. 26G are merely examples, and the present disclosure is not limited thereto.

The antennas 330 can be coupled to the body 310 via coupling mechanism including, but not limited to, screw coupling, snapping, friction-fit, or pin connection, etc. However, the present disclosure is not limited thereto, and other coupling mechanism can also be used. The antennas 330 can be separately provided and connected to the body via coupling wire, extension cable, etc. In these embodiments, the antennas 330 can be disposed or embedded on a portion of the remote controller 210 or the drone 220.

Although FIG. 26A-FIG. 26G show that the antennas 330 have the same shape and size, at least one of them may have a different shape and/or size. Furthermore, although FIG. 26A-26G show that the antennas 330 are disposed on the same side of the body 310, the present disclosure is not limited thereto, and at least one of them can be disposed on a different side of the body 310. Different type of antennas can be used The antennas 330 can include one or more of a monopole antenna, dipole antenna, a Yagi antenna, etc. At least one of the antennas 330 may have a different type from other antennas.

Figure 27A:
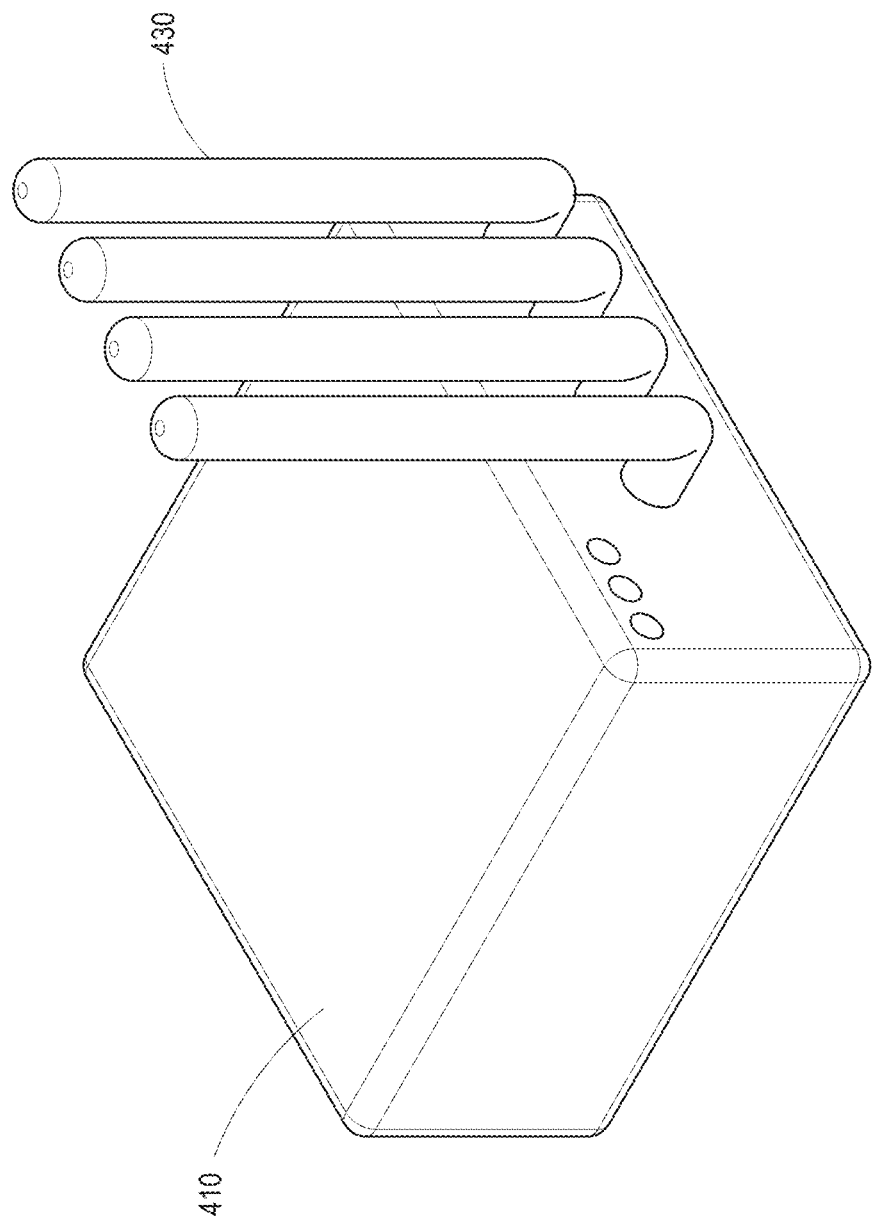
Figure 27B:
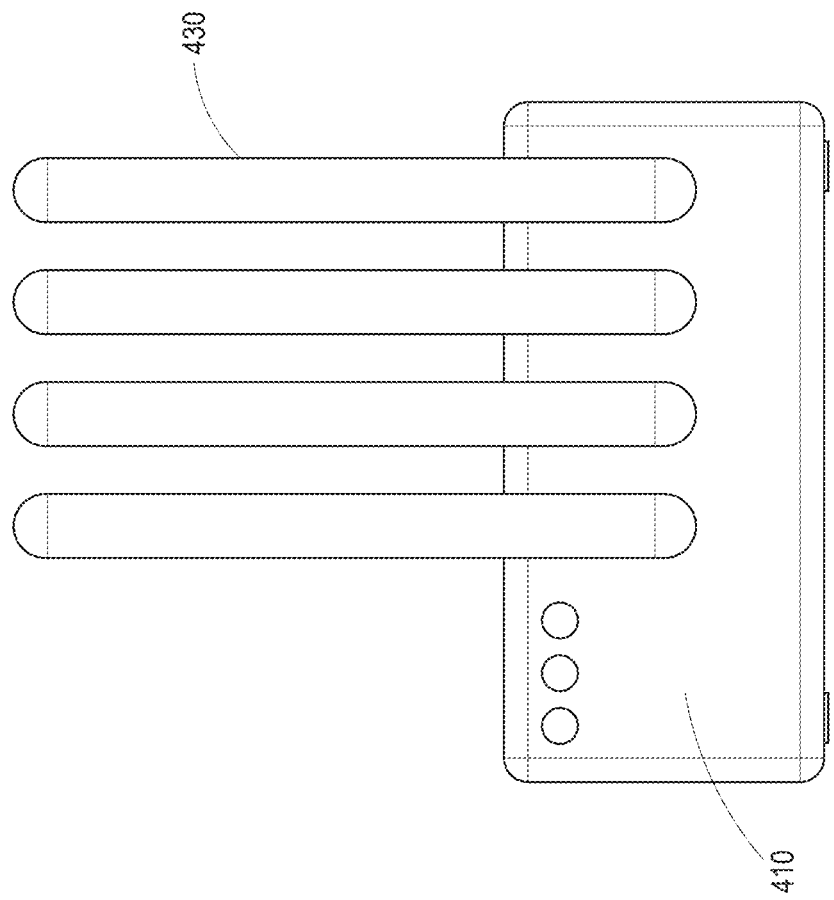
Figure 27C:
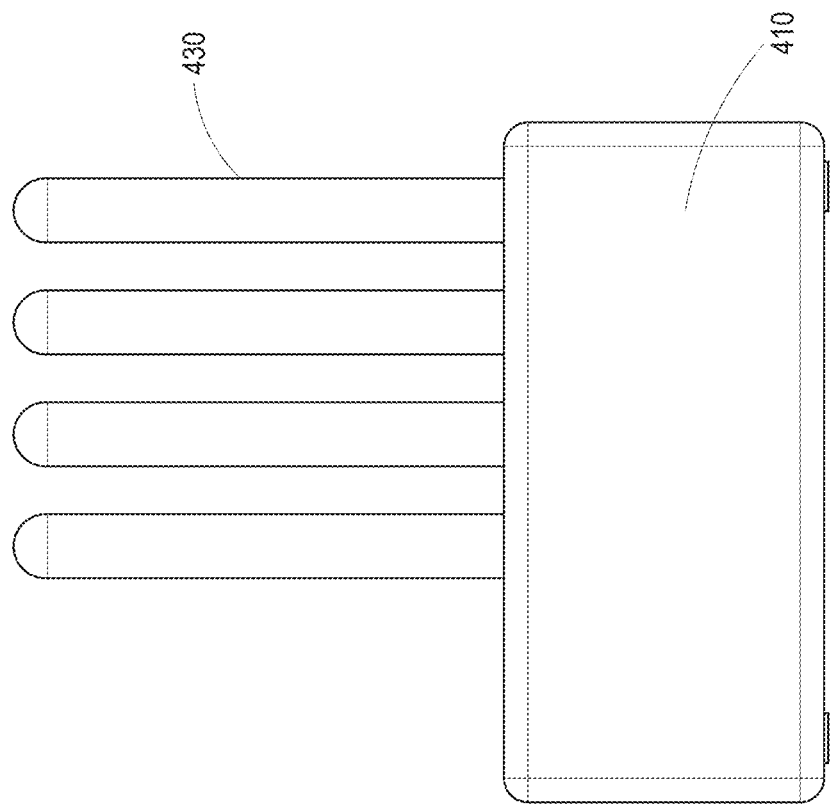
Figure 27D:
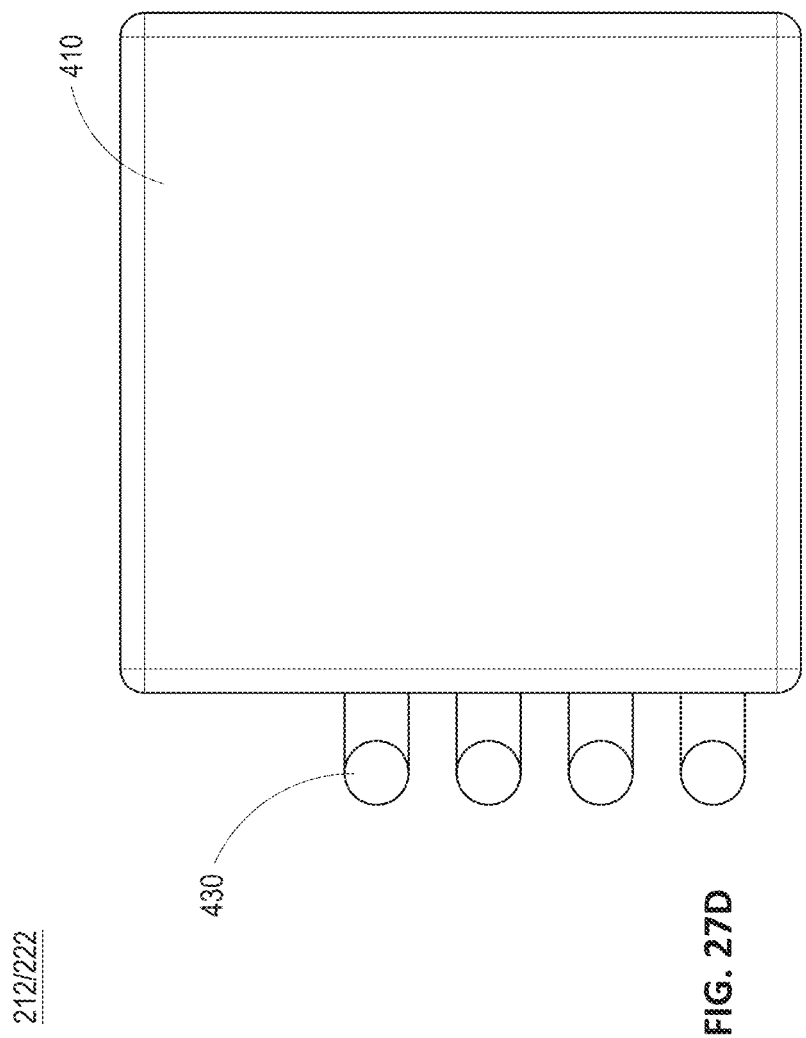
Figure 27E:
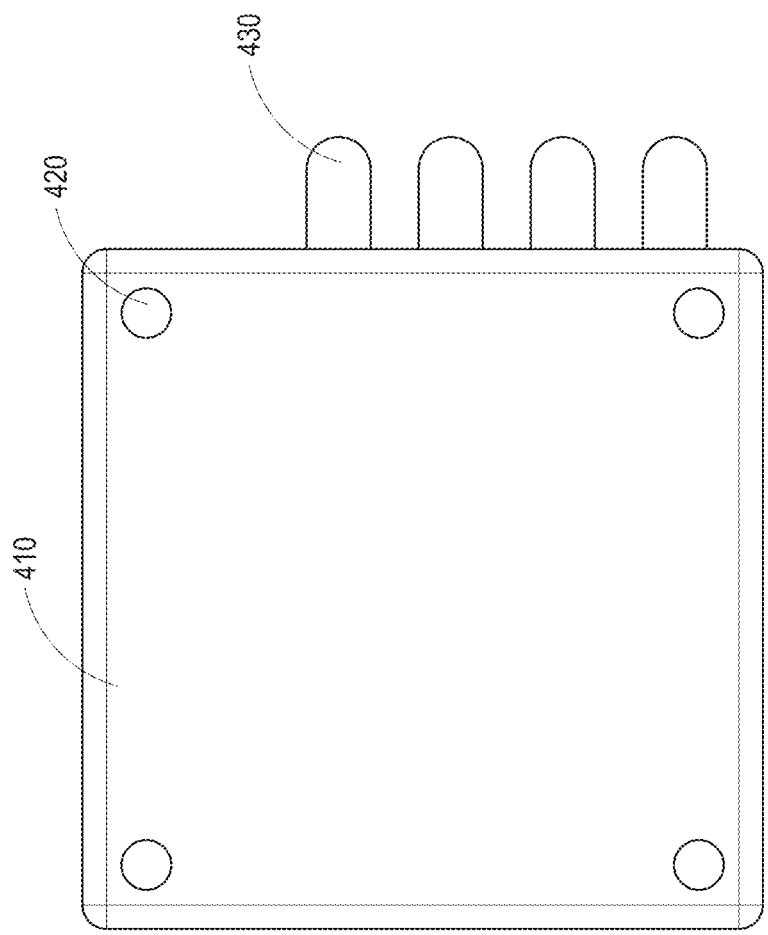
Figure 27F:
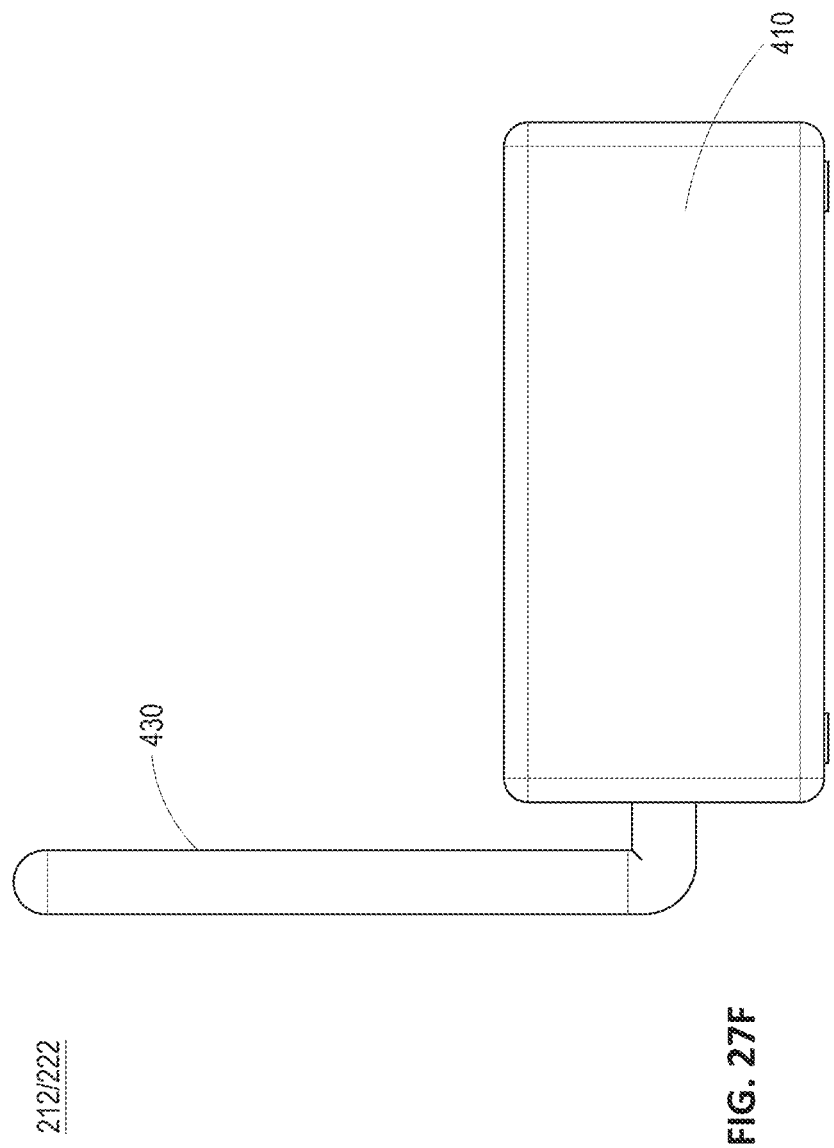

FIG. 27A-FIG. 27G show another example exterior designs of the ground-based module 212 or the remote-mounted module 222. In some embodiments, FIG. 27A-FIG. 27G can be used for the remote-mounted module 222. In other embodiments, FIG. 27A-FIG. 27G can be used for the ground-based module 212. These exterior designs are merely examples, and the present disclosure is not limited thereto. FIG. 27A shows a perspective view of the ground-based module 212 or the remote-mounted module 222. FIG. 27B-FIG. 27G respectively show front, rear, right side, top plan, and bottom plan views of the ground-based module 212 or the remote-mounted module 222. In FIG. 27A-FIG. 27G, the ground-based module 212 or the remote-mounted module 222 may include a body 310, a protrusion 320, and one or more antennas 330. Although four antennas are shown in the figures, the present disclosure is not limited thereto. As described above, the protrusion 320 may be coupled to a designated area of the ground-based module 212 or the remote-mounted module 222. The dimensions shown in FIG. 27A-FIG. 27G are merely examples, and the present disclosure is not limited thereto.

The antennas 430 can be coupled to the body 410 via coupling mechanism including, but not limited to, screw coupling, snapping, friction-fit, or pin connection, etc. However, the present disclosure is not limited thereto, and other coupling mechanism can also be used. The antennas 430 can be separately provided and connected to the body via coupling wire, extension cable, etc. In these embodiments, the antennas 430 can be disposed or embedded on a portion of the remote controller 210 or the drone 220.

Although FIG. 27A-FIG. 27G show that the antennas 430 have the same shape and size, at least one of them may have a different shape and/or size. Furthermore, although FIG. 27A-FIG. 27G show that the antennas 430 are disposed on the same side of the body 410, the present disclosure is not limited thereto, and at least one of them can be disposed on a different side of the body 410. The antennas 430 can include one or more of a monopole antenna, a dipole antenna, a Yagi antenna, etc. At least one of the antennas 430 may have a different type from other antennas.

Embodiments of the described technology can be used for many different applications including, but not limited to, a military purpose, a commercial purpose, or private use.

Those skilled in the art will appreciate that, in some embodiments, additional components and/or steps can be utilized, and disclosed components and/or steps can be combined or omitted.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the described technology.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

The above description discloses embodiments of systems, apparatuses, devices, methods, and materials of the present disclosure. This disclosure is susceptible to modifications in the components, parts, elements, steps, and materials, as well as alterations in the fabrication methods and equipment. Such modifications will become apparent to those skilled in the art from a consideration of this disclosure or practice of the disclosure. Consequently, it is not intended that the disclosure be limited to the specific embodiments disclosed herein, but that it cover all modifications and alternatives coming within the scope and spirit of the described technology.

What is claimed is:

1. A tamper-resistant datalink communications system comprising:
a ground-based communications module configured to be coupled to a radio controller configured to remotely control a drone comprising a plurality of actuators; and
a remote-mounted communications module configured to communicate data with the ground-based communications module, the remote-mounted communications module configured to be coupled to the drone,
the ground-based communications module comprising:
a ground processor configured to:
receive a plurality of first signals each having a first signal format and modulated with a first modulation scheme from the radio controller,
convert the plurality of first signals to a second signal having a second signal format different from the first signal format and modulated with a second modulation scheme different from the first modulation scheme, and
generate a plurality of second duplicated signals comprising two or more duplicated signals of the second signal, each of the plurality of second duplicated signals having the second signal format;
a plurality of ground transmitters configured to operate in different frequency channels and respectively transmit the plurality of second duplicated signals to the remote-mounted communications module respectively via the different frequency channels; and
a plurality of ground receivers each configured to receive a verification signal, from the remote-mounted communications module, indicating that the plurality of first signals have been successfully retrieved by the remote-mounted communications module,
the remote-mounted communications module comprising:
a plurality of remote receivers configured to respectively receive the plurality of second duplicated signals from the ground-based communications module;

a remote processor configured to:
compare the plurality of second duplicated signals,
determine whether at least one of the plurality of second duplicated signals is different from the remaining second duplicated signals based on the comparison,
restore the second signal in response to determining that all of the second duplicated signals are the equivalent, plus or minus a time latency threshold,
convert the restored second signal to the plurality of first signals, and
control the plurality of actuators of the drone respectively with the plurality of first signals; and
a plurality of remote transmitters each configured to transmit the verification signal to the ground-based communications module.

2. The system of claim 1, wherein the remote processor is configured to determine the second signal has been interfered, tampered, or modified in response to determining that at least one of the plurality of second duplicated signals is different from the remaining second duplicated signals.

3. The system of claim 1, wherein the verification signal comprises the plurality of second duplicated signals respectively sent by the plurality of remote transmitters.

4. The system of claim 1, wherein the first modulation scheme is pulse width modulation (PWM) and the second modulation scheme is pulse position modulation (PPM).

5. The system of claim 4, wherein each of the plurality of second duplicated signals comprises one or more PPM frames each including a plurality of PWM frames having the same number of the one or more actuators of the drone, the remote processor configured to control the one or more actuators respectively with the plurality of PWM frames.

6. The system of claim 1, wherein each of the plurality of ground transmitters is configured to be programmed to add one or more additional frequency hopping channels configured to operate in different frequencies.

7. A tamper-resistant datalink communications system comprising:
a ground-based communications module configured to be coupled to a radio controller configured to remotely control a drone comprising a plurality of actuators, the ground-based communications module comprising:
a ground processor configured to:
receive a plurality of first signals each having a first signal format and modulated with a first modulation scheme from the radio controller,
convert the plurality of first signals to a second signal having a second signal format different from the first signal format and modulated with a second modulation scheme different from the first modulation scheme, and
generate a plurality of second duplicated signals comprising two or more duplicated signals of the second signal, each of the plurality of second duplicated signals having the second signal format;
a plurality of ground transmitters configured to operate in different frequency channels and respectively transmit the plurality of second duplicated signals to the drone respectively via the different frequency channels, the number of the plurality of ground transmitters being the same as the number of the plurality of second duplicated signals, the plurality of first signals configured to respectively control the plurality of actuators of the drone; and
a plurality of ground receivers configured to communicate data between the drone and the ground processor,
the plurality of second duplicated signals configured to cause a remote processor of the drone to restore the second signal by:
comparing the plurality of second duplicated signals,
determining whether at least one of the plurality of second duplicated signals is different from the remaining second duplicated signals based on the comparison, and
restoring the second signal in response to determining that all of the second duplicated signals are the equivalent, plus or minus a time latency threshold.

8. The system of claim 7, wherein at least one of the plurality of ground receivers is configured to receive a verification signal, from the drone, indicating that the plurality of first signals have been successfully retrieved by the drone.

9. The system of claim 8, wherein the ground processor is configured to provide a transmission error signal in response to determining that the verification signal is not received for a predetermined period of time.

10. The system of claim 7, wherein at least one of the plurality of ground transmitters is configured to be programmed to add one or more additional frequency hopping channels configured to operate in different frequencies.

11. The system of claim 7, wherein each of the plurality of ground transmitters is configured to be programmed to add one or more additional frequency hopping channels configured to operate in different frequencies, and wherein the one or more additional frequency hopping channels added to one of the plurality of ground transmitters are configured to operate in one or more first frequencies that are different from any of frequencies operating in the remaining ones of the plurality of ground transmitters.

12. The system of claim 7, wherein the ground-based communications module is configured to be wirelessly coupled to the remote controller.

13. The system of claim 7, wherein the ground-based communications module is configured to be physically coupled to a designated area in the remote controller.

14. The system of claim 7, wherein the ground-based communications module comprises a user interface configured to provide a status or quality of communication channels used by the plurality of ground transmitters.

15. A tamper-resistant datalink communications system comprising:
a remote-mounted communications module configured to communicate data with a remote controller configured to remotely control a drone comprising a plurality of actuators, the remote-mounted communications module comprising:
a plurality of remote receivers configured to respectively receive a plurality of duplicate signals of a second signal from the remote controller, each of the plurality of second duplicated signals comprising a plurality of first signals modulated with a first modulation scheme having a first signal format, each of the plurality of second duplicated signals having a second signal format different from the first signal format and modulated with a second modulation scheme different from the first modulation scheme;
a remote processor configured to:
compare the plurality of second duplicated signals, determine whether at least one of the plurality of second duplicated signals is different from the remaining second duplicated signals based on the comparison, restore the second signal in response to determining that all of the second duplicated signals are the equivalent, plus or minus a time latency threshold, convert the restored second signal to the plurality of first signals, and control the plurality of actuators of the drone respectively with the plurality of first signals; and a plurality of remote transmitters configured to communicate data between the remote processor and the remote controller.

16. The system of claim 15, wherein at least one of the remote transmitters is configured to transmit a verification signal, to the remote controller, indicating that the plurality of first signals have been successfully retrieved by the remote-mounted communications module.

17. The system of claim 16, wherein the verification signal comprises the plurality of second duplicated signals respectively sent by to the plurality of remote transmitters.

18. The system of claim 15, wherein the remote processor is configured to determine the second signal has been interfered, tampered, or modified in response to determining that at least one of the plurality of second duplicated signals is different from the remaining second duplicated signals.

\* \* \* \* \*